US 6,587,690 B1

United States Patent
Di Huo et al.

(10) Patent No.: US 6,587,690 B1
(45) Date of Patent: Jul. 1, 2003

(54) METHOD FOR ALLOCATING DOWNLINK ELECTROMAGNETIC POWER IN WIRELESS NETWORKS

(75) Inventors: David Di Huo, Lafayette, NJ (US); Eshwar Pittampalli, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/249,313

(22) Filed: Feb. 12, 1999

(51) Int. Cl.[7] .................................................. H04Q 7/20
(52) U.S. Cl. ........................ 455/446; 455/522; 455/423; 455/67.1; 370/254
(58) Field of Search .................... 455/446, 69, 522, 455/436, 67.1, 423, 422, 447, 424, 561; 370/244, 254, 318, 320, 329, 342, 335

(56) References Cited

U.S. PATENT DOCUMENTS

| | | | | |
|---|---|---|---|---|
| 5,278,992 A | * | 1/1994 | Su et al. ........................ 455/69 |
| 5,307,510 A | * | 4/1994 | Gunmar et al. ............. 455/67.1 |
| 5,697,053 A | * | 12/1997 | Hanly ........................ 455/522 |
| 5,878,328 A | * | 3/1999 | Chawla et al. ............. 455/67.1 |
| 5,887,245 A | * | 3/1999 | Lindoth et al. ................ 455/69 |
| 5,926,762 A | * | 7/1999 | Arpee et al. ................. 455/447 |
| 5,960,341 A | * | 9/1999 | LeBlanc et al. ............. 455/426 |
| 5,963,867 A | * | 10/1999 | Reynolds et al. ........... 455/457 |
| 6,111,857 A | * | 8/2000 | Soliman et al. ............. 370/254 |
| 6,119,009 A | * | 9/2000 | Baranger et al. ............. 455/446 |
| 6,246,880 B1 | * | 6/2001 | Iizuka ........................ 455/446 |
| 6,463,295 B1 | * | 10/2002 | Yun ............................ 455/522 |
| 6,477,376 B1 | * | 11/2002 | Carter ......................... 455/446 |

FOREIGN PATENT DOCUMENTS

| | | |
|---|---|---|
| EP | 0741467 A | 11/1996 |
| EP | 0762668 A | 3/1997 |
| EP | 0817516 A | 1/1998 |
| EP | 0856955 A | 8/1998 |

OTHER PUBLICATIONS

Pallares et al, "Analysis of Path loss and Delay Spread at 900 MHz and 2.1 GHz while entering tunel", IEEE Trans. on Vehicular Technology, vol. 50, No. 3, May 2001, pp. 767–776.*
R. Kress, *Numerical Analysis*, Springer Verlag, New York (1998), pp. 46–47.
L. Raade and B. Westergre, *BETA: Mathematics Handbook*, CRC Press, Boca (1992) pp. 264–267.

* cited by examiner

*Primary Examiner*—Duc Nguyen

(57) ABSTRACT

A method for allocating downlink power in a wireless network determines downlink transmit powers to permit a target performance goal to be satisfied for defined radio frequency coverage areas. Base stations transmit electromagnetic transmissions. Received signal parameters of the electromagnetic transmissions are measured at measurement locations within defined radio frequency coverage areas. A data processing system determines propagation factors associated with the electromagnetic transmissions as a function of the measurement locations. The data processing system determines a downlink transmit power for at least one of the base stations based upon at least one target performance goal for the coverage areas and the propagation factors.

31 Claims, 8 Drawing Sheets

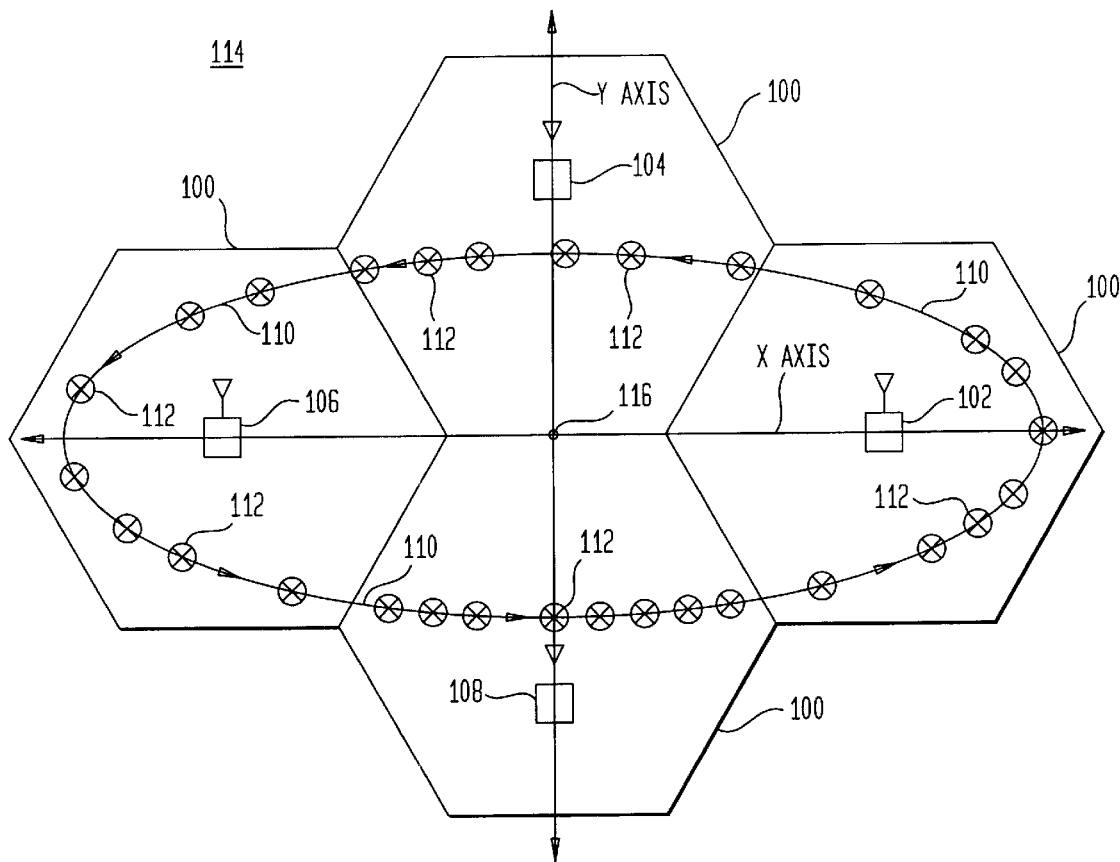

METHOD FOR ALLOCATING DOWNLINK ELECTROMAGNETIC POWER IN WIRELESS NETWORKS

FIELD OF THE INVENTION

The invention relates to a method for allocating downlink electromagnetic power to enhance performance of a wireless network.

BACKGROUND OF THE INVENTION

Whenever a wireless network is initially installed or expanded, various wireless parameters must be tuned to proper values prior to full commercial operation. The tuning of wireless parameters is referred to as radio frequency (RF)network optimization. The RF optimization includes adjusting the downlink transmit power of base stations.

Wireless service providers often have relied upon a trial-and-error strategy to optimize radio frequency antenna coverage of cells or other geographic areas within a wireless network. The trial-and-error strategy requires repeated measurements at the same locations through iterative test drives until a feasible downlink transmit power for each base station is found. The test drive refers to taking radio frequency measurement samples from a vehicle which is equipped to measure radio frequency parameters versus location while driving through the coverage area of a wireless network. Based on recorded measurements of parameters in a cluster of cells during a test drive, recommendations on adjusting system parameters are established. However, the trial-and-error approach sometimes leads to quality deterioration or service interruption if incorrect recommendations are applied to an operational system. After the recommended changes to system parameters are implemented, another test drive typically is completed to validate system performance. If the latest test drive did not indicate adequate performance, the wireless network or expansion may be delayed from commercial operation, while yet another round of parameter adjustments is followed by a corresponding test drive.

Even if a wireless network timely goes into commercial operation, improper radio frequency optimization may reduce the capacity of a wireless network. Failure to accurately set the parameters of downlink transmit power may lead to unnecessary expenditures for capital intensive cellular infrastructure. For example, additional channel capacity or additional cell sites, which are not truly needed, may be added to compensate for an incorrectly optimized wireless system.

The trial-and-error approach to optimization wastes valuable time of engineering and technical resources by often entailing iterative or multiple field measurements to obtain an acceptable solution for radio frequency optimization. The repetitive nature of the trial-and-error tends to make such an approach difficult or impractical for handling large networks. Thus, a need exists for improving the accuracy of optimization rather than relying on the time-consuming and happenstance accumulation of empirical data.

During radio frequency optimization, the overall geographic coverage area may be divided into clusters of smaller geometric regions, each encompassing a few adjacent cells. The trial-and-error approach is then applied to the clusters, one after another. After finishing all clusters, the wireless network is re-optimized as a whole, particularly at the boundary between clusters, with the same trial-and-error method. Thus, the trial-and-error approach is time consuming and may not even produce suitable or optimum coverage results.

SUMMARY OF THE INVENTION

In accordance with the invention, a method for allocating downlink transmit-power in a wireless network determines downlink transmit powers to permit a target performance goal to be satisfied for defined radio frequency coverage areas. Base stations transmit electromagnetic transmissions. Received signal parameters of the electromagnetic transmissions are measured at measurement locations within defined radio frequency coverage areas. A data processing system determines propagation factors associated with the electromagnetic transmissions as a function of the measurement locations. A data processing system determines a downlink transmit power for at least one of the base stations based upon at least one target performance goal for the coverage areas and the propagation factors.

The target performance goal may comprise a target carrier-to-interference ratio for the coverage areas with reference to the propagation factor associated with each of the measurement locations. The processing system may calibrate the downlink transmit power to satisfy the target carrier-to-interference ratio for the measurement locations with a defined reliability. For example, the downlink transmit power may be selected such that a corresponding actual carrier-to-interference ratio meets or minimally exceeds the target-to-carrier interference ratio for the measurement locations with a defined reliability. The defined reliability may be defined in terms of probability or other statistical measures.

The systematic attributes of the method and its associated data structure increase the efficiency of radio frequency optimization by eliminating the recursive or iterative nature of taking field measurements pursuant to the conventional trial-and-error approach. Moreover, the method of the invention is well-suited for reliable execution on a general purpose computer.

BRIEF DESCRIPTION OF THE DRAWINGS

FIG. 3 shows a measuring procedure for measuring signal power in a wireless network in accordance with the invention.

FIG. 4 is an example of a data format for organizing signal power measurements acquired during the measuring procedure of FIG. 3.

DETAILED DESCRIPTION OF THE PREFERRED EMBODIMENTS

Figure 1:
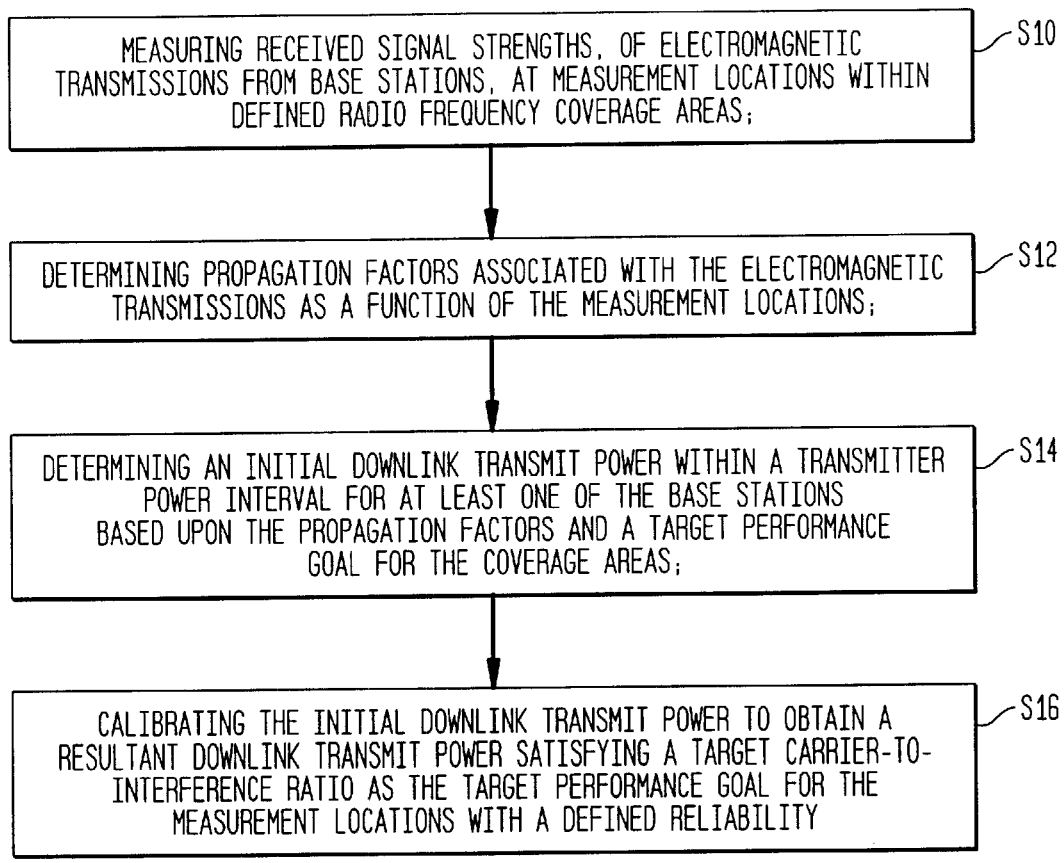
FIG. 1 is a flow chart illustrating a general method of allocating downlink transmit power in accordance with the invention.

In accordance with an example shown in FIG. 1, a method for allocating downlink transmit power includes measuring received signal powers; determining a propagation factor from the measured signal powers for each base station; calculating an initial downlink transmit power for each base station based on the corresponding propagation factor; and calibrating the initial downlink transmit power to obtain a resultant downlink transmit power to enhance performance of the wireless network. Performance may be enhanced by reducing co-channel interference in the wireless network or otherwise.

General Method for Power Allocation

Starting from step S10, a test receiver measures received signal parameters of corresponding base stations at measurement locations within defined radio frequency coverage areas. Although the signal parameters may include signal strength, background noise, or both, in an alternate embodiment the measured signal parameters may comprise signal-to-noise ratio, signal-to-interference ratio, frame-error rate, bit-error rate, or the like. Each defined radio frequency coverage area may represent a sector, a cell, or the like. In one example, step S10 includes measuring background noise associated with each of the measurement locations.

In step S12, a processing system accepts the measured received signal parameters from step S10 as input. The processing system determines a propagation factor of a respective electromagnetic signal for each of the base stations as a function of the measurement locations. The propagation factor characterizes the unique propagation path between a base station and each measurement location. The base station transmits a downlink electromagnetic transmission to the test receiver at the measurement location via one or more unique propagational paths. The propagation factor represents the aggregate impact of propagational variables for one or more propagational paths between a measurement location and a corresponding downlink base station. The propagation factor inherently considers propagational variables such as free space loss, diffraction loss, and obstruction loss, among others to provide a realistic indication of actual propagation conditions within the wireless network to an accuracy partially determined by the number of measurement locations per geographic area.

In step S14, the processing system generally determines (e.g., calculates) an initial downlink transmit power within a transmitter power interval for each of the base stations based upon a target carrier-to-interference ratio for the coverage areas. The initial downlink transmit power is determined with reference to the propagation factors associated with corresponding propagational paths between base stations and respective measurement locations. Although the target carrier-to-interference ratio may be uniform for the entire network, the target carrier-to-interference ratio may be different for different geographic coverage areas to tailor radio frequency coverage to meet traffic conditions or reliability concerns.

In one illustrative example, step S14 preferably includes calculating the initial downlink transmit power for each of the base stations with reference to each measurement location based upon the target carrier-to-interference ratio, the measured signal powers, the measured background noise, and the propagation factors.

In step S16, the processing system calibrates the initial downlink transmit power to obtain a resultant downlink transmit power satisfying the target carrier-to-interference ratio for the measurement locations with a defined reliability. The defined reliability may represent the probability of the resultant downlink transmit power meeting or exceeding a target threshold in a particular geographic coverage area, where the target threshold is a signal parameter (e.g., signal strength) corresponding to the target carrier-to-interference ratio. In an example, the resultant downlink transmit power is selected such that a corresponding actual carrier-to-interference ratio meets or minimally exceeds the target-to-carrier interference ratio for the measurement locations with a defined reliability.

The defined reliability may represent a minimum probability or percentage of time in which the actual carrier-to-interference ratio meets or exceeds the target carrier-to-interference ratio for the aggregate measurement locations associated with a corresponding geographic coverage area. The reliability may be expressed as a fraction in which the numerator includes the number of measurement locations in a geographic area that permit the target to carrier-to-interference ratio to be exceeded. The denominator of the fraction represents the total number of measurement locations in the same geographic area that are considered.

The resultant downlink power may be referred to as the minimal downlink power corresponding to an actual carrier-to-interference ratio meeting or exceeding the target carrier-to-interference ratio with a given probability. The actual carrier-to-interference ratio preferably meets or minimally exceeds the target-to-carrier interference ratio for the measurement locations with a defined reliability consistent with the known maximum power of each of the base stations. Each resultant downlink power may be viewed as a function of the calibration factor, the target carrier-to-interference ratio, the measured signal powers, the measured noise signal powers, the propagation factors, and the measurement locations.

At the fixed end, the base station is associated with a power adjuster for adjusting its downlink power. For example, the base station may include an integral power control device for producing a continuously variable transmit downlink power or discrete steps of transmit downlink power. In an alternate embodiment, a base station includes an adjustable attenuator coupled to a radio frequency transmit port of the base station. The maximum transmitter power is the highest transmit power that the base station is capable of producing based on hardware limitations, governmental regulations, or both. The downlink transmit power may be normalized for a scale ranging from 0 to 1, with one being the maximum transmitter power. The normalization of the downlink transmit power provides a convenient format for subsequent mathematical operations. The downlink power, once set, remains fixed for a reasonable time which exceeds the duration of a typical expected call.

Antennas are coupled to the base stations. The transmit-power allocation method of the invention produces the best results if the antennas are installed with proper orientations. If the antennas are installed with proper orientations, minimal or no radio frequency coverage improvement can be achieved by changing the antenna orientation or other antenna parameters. Here, a radio frequency coverage improvement means that the carrier-to-interference ratio could be enhanced without reducing traffic capacity of the wireless network. Nevertheless, even if the antennas are not properly oriented, antennas with corresponding fixed radiation patterns are sufficient to carry out the power allocation method. Although both the orientation and radiation patterns of the antennas contribute to the actual carrier-tointerference ratio of the wireless network, the antenna orientation for a directional antenna and the transmitter power are mutually independent parameters; hence, capable of independent power adjustment.

Mathematical Calculations for Power Allocation

Figure 2:
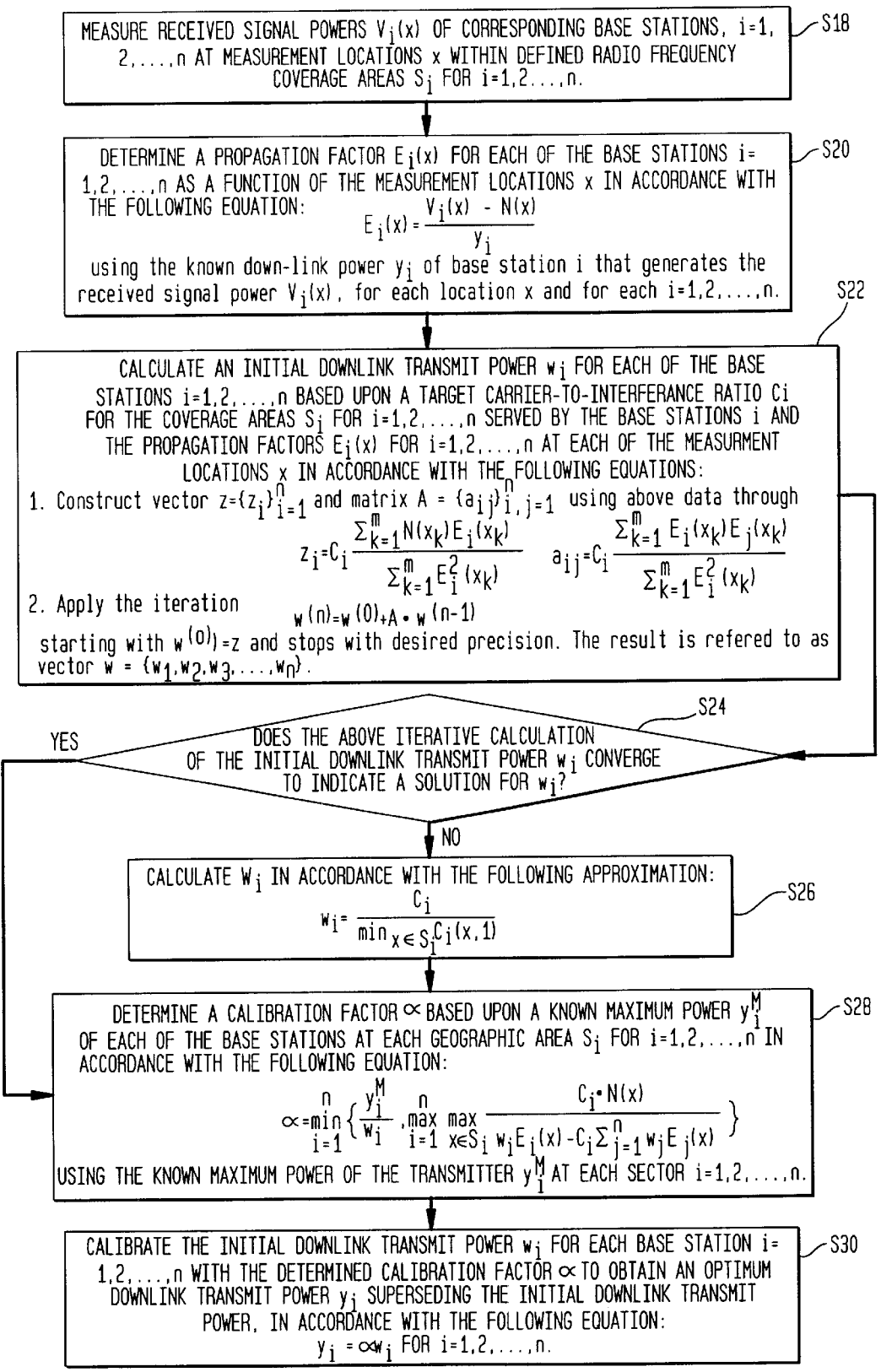
FIG. 2 is a flow chart providing an illustrative example of the method of FIG. 1.

FIG. 2 provides an illustrative example of the mathematical calculations that may underlie the general steps presented in FIG. 1. Step S18 of FIG. 2 describes step S10 of FIG. 1 in mathematical terms. Step S20 of FIG. 2 provides an illustrative mathematical equation which is applicable to step S12 of FIG. 1. Steps S22, S22 and S24 provide a group of mathematical equations which are applicable step S14. Step S28 and step S30 disclose mathematical equations which are applicable to step S16.

Beginning in step S18, a test receiver measures received signal powers $V_i(x)$ of corresponding base stations, i=1, 2, ..., n at measurement locations x within defined radio frequency coverage areas $S_i$ for i=1, 2, ..., n. The measurement of the received signal power provides a basis for determination of the propagation factor in step S20. On the mobile side, m measurement locations are selected and considered representative of a desired radio frequency network coverage.

A measurement location is a geographical point where a mobile station is supposed to obtain communications service from the wireless network. A test receiver measures a received signal transmitted by the base station with a known downlink transmit power. The known downlink transmit power typically represents a pre-adjustment transmit power if any iteration of the allocating procedure is independently considered from all other iterations. In an illustrative example, the measured signal parameters include received signal strengths and background noise. The test receiver measures the received signal strength at the measurement locations which may be selected on the basis of traffic distribution or other business concerns. In addition, the test receiver may measure the noise $N(x)$. The signal strength parameter measurements preferably are normalized to allow ready comparisons of all measurements and mathematical manipulation in subsequent procedures.

In step S20, a propagation factor $E_i(x)$ is determined for each of the base stations i=1, 2, ..., n as a function of the measurement locations x in accordance with the following equation:

$$E_i(x) = \frac{V_i(x) - N(x)}{y_i} \tag{1}$$

wherein $y_i$ is a known downlink power of base station i, $V_i(x)$ is a received signal parameter (e.g., signal strength) as a function of measurement location x, and $N(x)$ is a background noise power as a function of measurement location x.

In step S22, a processing system calculates an initial downlink transmit power $w_i$ for each of the base stations i=1, 2, ..., n based upon a target carrier-to-interference ratio $C_i$ for the coverage areas $S_i$ for i=1, 2, ..., n served by the base stations i and the propagation factors $E_i(x)$ for i=1, 2, ..., n at each of the measurement locations x. The initial downlink transmit power $w_i$ is calculated such that an actual carrier-to-interference ratio $C_f(x)$ for each cell meets or exceeds a target carrier-to-interference ratio selected as a goal by a user of the adjustment method. As used herein, the actual carrier-to-interference ratio shall refer to the post-adjustment carrier-to-interference ratio, unless otherwise specified. However, the actual carrier-to-interference ratio should just barely exceed or minimally exceed the target carrier-to-interference ratio, to minimize transmit power and thereby increase system capacity. Moreover, minimizing transmit power reduces concerns of electromagnetic biological hazards. To adjust the downlink transmit power, the actual carrier-to-interference ratio at those m locations are set above a target carrier-to-interference with reference to a certain probability. The probability and the corresponding target carrier-to-interference are selected as goals by a user of the power allocation method in accordance with the invention.

The actual carrier-to-interference ratio $C_f(x)$ may be expressed as a function of measurement location x, propagation factor $E_i(x)$, noise $N(x)$, and transmitter power $y_i$ in accordance with equation 18. (See equation 18 in the Mathematical Models section infra where many numerically referenced equations are presented in sequential order.) The actual carrier-to-interference ratio for a cell is determined for each measurement location within the cell, based on measurement of received signal parameters, such as signal strength, received noise, or both, in step S18. The measured signal strength and measured noise of step S18 may be used in conjunction with equation 18 to determine the actual carrier-to-interference ratio.

The target carrier-to-interference ratio $C_i$ for a cell is selected as a goal by the user. If the actual-carrier to interference ratio is equal to or greater than the target carrier-to-interference with a given probability, the actual carrier to interference satisfies the target carrier-to-interference. Equation 20 (see Mathematical Models section infra) describes the target carrier-to-interference as a constant for all the measurement locations within a cell, a sector, or another defined geographic coverage area.

Step S22 involves calculating the initial selected downlink power within a downlink power interval by completing the following mathematical procedure. First, a vector $z=\{z_i\}_{i=1}^n$ and a matrix $A=\{a_{ij}\}_{i,j=1}^n$ are constructed in accordance with the following equations:

$$z_i = C_i \frac{\sum_{k=1}^{m} N(x_k) E_i(x_k)}{\sum_{k=1}^{m} E_i^2(x_k)} \tag{2}$$

$$a_{ij} = C_i \frac{\sum_{k=1}^{m} E_i(x_k) E_j(x_k)}{\sum_{k=1}^{m} E_i^2(x_k)} \tag{3}$$

wherein $C_i$ represents a carrier-to-interference ratio for a defined coverage area i, $E_i(x)$ is a propagation factor for first set of defined coverage areas i, $E_j(x)$ is a propagation factor for a second set of defined coverage areas distinct from the first set, $N(x_k)$ represents background noise, m is the considered (e.g., total) number of measurement locations x, k represents a particular measurement location, and n is the total number of the defined coverage areas within the first set and the second set.

Second, an iterative procedure is applied to the vector z and matrix A to solve for the vector $w=\{w_1, w_2, w_3, \ldots w_n\}$ starting with $w^{(0)}=z$ in accordance with the following equation:

$$w^{(n)} = w^{(0)} + A \cdot w^{(n-1)} \tag{4}$$

The foregoing equation (equation 4) is an iterative equation, which is applied until a desired precision is reached. A desired precision is reached if a difference between the result of the last previous iteration and the present result is less than a defined threshold. For example, the defined threshold may be empirically determined by field studies of wireless networks.

However, if the result of equation 4 does not converge, the solution for vector w may be estimated by a first iteration, a second iteration, or the latest iteration that is sufficiently reliable and consistent with earlier iterations. For example, the first iteration of equation 4 has w=z.

Although the vector w falls within a downlink power interval, the initial downlink power is preferably mathematically treated to render a more exact solution or verify its exactness prior to adjusting the downlink transmit power of the base station. Once the initial downlink power is treated or verified to be sufficiently reliable, the initial downlink power may be referred to as the resultant downlink transmit power. In any event, the initial downlink transmit power should not be confused with the measured, received downlink transmit power of step S18, which merely represents a field measurement, as opposed to the determination of a suitable power setting for radio frequency coverage enhancement.

The rationale behind the equations for calculating the initial downlink power is best understood with reference to equation 23 (see Mathematical Models section infra), which forms the basis for equations 2, 3, and 4. Equation 23 represents a square error difference between the target carrier-to-interference and the measured carrier-to-interference. If the square error difference is minimized, the result defines a power interval in which a resultant downlink transmit power may be found for the base station. In practice, each base station may have a unique power interval and a corresponding unique resultant downlink transmit power.

Equation 23 is a basic expression of the minimum-square error approach for determining the resultant base station powers for each selected base station in the wireless network. The resultant base station downlink power is determined to achieve the target carrier-to-interference ratio or to minimally surpass the target carrier-to-interference ratio. Once the resultant downlink transmit power is applied to a wireless network, the resultant downlink transmit power may be referred to as a post-adjustment downlink transmit power. Equation 24 expresses the value of y that can minimize equation 23. Equation 26 is a vector representation of equation 24 used merely to simplify the expression of equation 24. Equation 26 may be rewritten as equation 31.

While the solution of equation 31 represents the resultant downlink transmit power for each base station, execution of equation 31 may be problematic because of typical computer hardware limitations. Typical hardware limitations include quantization error and limitations on the maximum number of significant digits for mathematical calculations. Accordingly, inverting the matrix of equation 31 tends to produce a crash of computer operations or lead to inaccurate results. Accordingly, instead of solving equation 31, the processing system first attempts to solve equation 26 by application of equation 4, as previously discussed to reduce the potential for inoperative problems with computers or inaccurate results. Thus, the foregoing approach as set forth in equations 2, 3, and 4, represents more than merely a theoretical solution to the problem of attaining a suitable resultant downlink transmit power for each selected base station in the wireless network. Rather, equations 2, 3, and 4 represent the refinement and tempering of raw mathematical equations into a practical algorithm well-suited for reliable operation in a general purpose computer or another data processing system. Moreover, in an example equation 4 is iterative and may be solved merely by using multiplication, which makes it resistant to the numerical instability as may occur by division or matrix inversion.

In step S24, a processing system determines if the above iterative calculation of the initial downlink transmit power $w_i$ converge to indicate a solution for $w_i$.

The relation between the convergence of the iteration of equation 4 and the physical attributes of a particular wireless network provides the additional information with regard to the quality of the network. Divergence of the algorithm indicates serious design weakness of the wireless network, such as an unintentionally redundant radio frequency coverage of different base stations.

Alternatively, rather than attaining a global solution of the equation 4 in step S22, an approximation can provide a local solution of an initial downlink transmit power within a transmit power interval for corresponding base stations. The global solution is preferred to the local solution because the results are more accurate. In step S26, the processing system calculates $w_i$ in accordance with the following approximation:

$$w_i = \frac{C_i}{\min_{x \in S_i} C_i(x, 1)} \quad (5)$$

wherein $C_i$ represents a carrier-to-interference ratio for a defined coverage area i, x represents a measurement location, $w_i$ represents an initial downlink power for base station i within a power interval, and $S_i$ refers to defined measurement locations x within the coverage area i.

Alternately, the following set of equations may be used instead of equation 5.

$$y_i \approx C_i \cdot \frac{N^{M,i} + \sum_{j \neq i} E_j^{M,i}}{E_i^{m,i}} \quad (6)$$

$$E_j^{M,k} = \max_{x \in S_k} E_j(x) \quad (7)$$

$$E_i^{m,k} = \min_{x \in S_k} E_i(x) \quad (8)$$

$$N^{M,i} = \max_{x \in S_i} N(x) \quad (9)$$

wherein $y_i$ is a known downlink power of base station i, $C_i$ represents a carrier-to-interference ratio for a defined coverage area, $E_i(x)$ is a propagation factor for first set of defined coverage areas i, $E_j(x)$ is a propagation factor for a second set of defined coverage areas distinct from the first set, N(x) represents background noise, m is the considered (e.g., total) number of measurement locations x, k represents a particular measurement location, $S_i$ represents defined measurement locations x (e.g., measurement locations that are relevant because of traffic considerations in the wireless network) within a coverage area i, and $S_k$ represents defined measurement locations x within a coverage area k.

Both equations 5 and 6 represent a local approximation of the initial downlink transmit power. One of the difficulties in arriving at a solution is that any change of downlink transmit power in one geographic coverage area (e.g., cell) may theoretically have a secondary impact all other geographic coverage areas. Where the secondary impact on other geographic coverage areas is ignored to some extent, a localized solution for the initial downlink transmit power may be obtained, such as pursuant to equation 5. However, the accuracy of the solution of equation 5 is less than the accuracy of the solution of equation 4, so equation 4 may be preferred and equation 5 may be relegated to the role of a contingent alternative to equation 4. Equation 5 or 6 is particularly applicable where equation 4 diverges or does not converge.

In step S28, a processing system determines a calibration factor $\alpha$ based upon a known maximum power $y_i^M$ of each of the base stations at each geographic area $S_i$ FOR i=1, 2, ..., n in accordance with the following equation:

$$\alpha = \min_{i=1}^{n} \left\{ \frac{y_i^M}{w_i}, \max_{i=1}^{n} \max_{x \in S_i} \frac{C_i \cdot N(x)}{w_i E_i(x) - C_i \sum_{j=1}^{n} w_j E_j(x)} \right\} \quad (10)$$

wherein $y_i^M$ is a known maximum downlink power of base station i, $C_i$ represents a carrier-to-interference ratio for a defined coverage area, $E_i(x)$ is a propagation factor for first set of defined coverage areas i, $E_j(x)$ is a propagation factor for a second set of defined coverage areas distinct from the first set, N(x) represents background noise, x represents a measurement location, n represents a total number of the first set or the second set, $w_i$ represents an initial downlink power for base station i within a power interval, and $w_j$ represents an initial downlink power for base station j within a power interval.

Equation 10 is directed at solving a problem posed by the minimum-square error approach set forth in step S22 or of the approximation in step S26. In the minimum-square error approach the initial downlink power is represented as a downlink power interval containing the true resultant downlink power. The calibration factor is determined to bring out the true resultant downlink power from within the downlink power interval as further described in step S30.

In step S30, a processing system calibrates the initial downlink transmit power $w_i$ for each base station i=1, 2, ..., n with the determined calibration factor $\alpha$ to obtain a resultant downlink transmit power $y_i$ superseding the initial downlink transmit power, in accordance with the following equation:

$$y_i = \alpha w_i \text{ for } i=1, 2, \ldots, n. \quad (11)$$

The resultant downlink power represents a refinement of the initial downlink transmit power. Equation 10 takes an initial downlink transmit power within a transmit power interval and scales the initial transmit power to the resultant transmit power that equals or just exceeds the target carrier-to-interference ratio with reference to a probability. Because the initial downlink transmit power, w, is distributed within the transmit power interval corresponding to the target carrier-interference ratio, one value of w within the transmit power interval may correspond to an actual carrier to interference ratio that exceeds the target carrier to interference ratio, while another value of w within the transmit power interval may correspond to an interference ratio that is greater than the target carrier-to-interference ratio. The attenuation factor makes the result w fall within the portion of the power interval that corresponds to a resultant downlink transmit power that meets or minimally exceeds the target carrier-to-interference ratio. The determination of the minimum-square equation, in effect, redistributes the carrier-to-interference ratios along the measurement locations, while the calibration adjusts the minimum-square error result to fit the inequality given by the target carrier-to-interference ratio.

The solution expressed as resultant transmit powers may be accompanied with an appropriate cautionary language or a confidence factor indicating the reliability of the solution. For example, equation 4 has a sufficiently high reliability when a certain minimum number of iterations are completed and the successive differences between the solutions falls under a threshold value. Therefore, solutions from equation 4 have the highest confidence when the threshold value is met. If the successive iterations of equation 4 do not converge, the latest iteration before the nonconvergence is used and is associated with a lower level of confidence which is lower than a highest confidence value. If the successive iterations do not converge, Equation 5 may be invoked as an alternative solution with a confidence that is equal to or lower than that of the latest iteration of equation 4 prior to the nonconvergence or divergence.

While other mathematical methods can be used to solve equation 26 (see Mathematical Models section infra) and reach a set of resultant downlink transmit powers, the other mathematical methods would necessitate subjecting the matrix A to different conditions, which may not be appropriate for a realistic engineering model of radio frequency coverage of a wireless network. The method of the invention provides a systematic approach for adjusting transmit power through organized acquisition of field measurements. The method formalizes the testing procedure to reduce labor and effort by employing a mathematical framework representative of signal propagation in a wireless network. As to the quality of the result, the resultant downlink transmit power allocations are mathematically provable as generally optimal, following from the minimum of minimum-square error approach. Moreover, the new procedure applies to unloaded as well as loaded systems, which makes it a natural candidate for the so-called continuous optimization of network.

Mathematical Models for Power Adjustment

Now that the mathematical principles underlying the power allocation method have been generally discussed, several key mathematical modeling concepts are presented to provide a firm foundation for equations set forth herein. First, a basic definition of carrier-to-interference is presented. Second, a minimum-square error approach is described based upon the basic definitions of the carrier-to-interference and derivations thereof. Third, the mathematical framework surrounding the calibration process is described. Fourth, the local approximation is described as an alternative to the minimum-square error approach.

Usually, the carrier-to-interference ratio is defined as $$(C/I)_i := \frac{V_i}{N + \sum_{\substack{j=1 \\ j \neq i}}^{n} V_j} \quad (12)$$

where $(C/I)_i$ refers to the carrier-to-interference ratio associated with base station i, N the background and $V_i$ the received carrier signal power of cell i. It is, however, convenient from the measurement point of view, to use the definition $$(C/I)_{i,1} := \frac{V_i}{N + \sum_{j=1}^{n} V_j} \quad (13)$$

In fact, the procedure could use either definition. This is because there exists a unique mapping between $(C/I)_{i,1}$ and $(C/I)_i$, i.e.

$$(C/I)_{i,1} = \frac{(C/I)_i}{1 + (C/I)_i} \quad (14)$$

which is a one-to-one mapping $$[0,\infty) \rightarrow [0,1) \quad (15)$$

Equations 12 and 14 are equivalent and the definition $(C/I)_{i,1}$ will be used in the following equations. Two important terms underlie the power allocation method: (1) the propagation factor and (2) the minimum-square error. The bridge between the propagation factor and the minimum-square error is a basic relationship, which is sought.

$V_i(x)$ denotes the total received signal power of any geographic coverage region i and at any measurement location x. The geographic coverage region may comprise a sector, a cell, or the like. Now, let $y_i$ be the downlink transmit power of geographic coverage region i. As a result of the linearity of the Maxwell's equations, $$V_i(x) = y_i E_i(x) + N(x), \quad (16)$$

where $E_i(x)$ is a function that is independent of $y_i$, and $N(x)$ is the noise received at the measurement location x. The background noise $N(x)$ includes all other signals than the wanted signal intended to serve the geographic coverage region. The background noise is received in the same frequency bandwidth, and includes more than just thermal noise. By this definition of $N(x)$, $V_i(x)$ has been associated with all unwanted electromagnetic powers receivable at location x. Thus, the power allocation method of the present invention is advantageously applicable to a loaded wireless network, an unloaded wireless network, or both because of the manner in which the noise is defined.

Because both $N(x)$ and $V_i(x)$ are physically measurable, $E_i(x)$ can be determined for given $y_i$. $E_i(x)$ refers to the propagation factor, because it accounts for the attenuation of the signal strength, or another measurable effect of a different signal parameter, caused by the propagation of electromagnetic waves. In a CDMA(e.g., CDMA IS-95) network, the quantity $y_i E_i(x)$ may correspond to the energy per chip $E_c$, which can be derived from the product of two values that can be measured by the pseudo-noise scanning receiver directly, for example, $$\frac{E_c}{I_0} \cdot I_0 W = E_c \cdot W, \quad (17)$$

where W is the known bandwidth and $I_0$ refers to the total interference.

Let $C_i(x)$ be the carrier-to-interference ratio for geographic coverage area i and at measurement location x, then, according to the definition of expression 13, $$C_i(x) = \frac{y_i \cdot E_i(x)}{N(x) + \sum_{k=1}^{n} y_k \cdot E_k(x)} \quad (18)$$

where $y_i \cdot E_i(x)$ is the signal power received at location x from geographic coverage area i and the wireless network includes a total of n co-channel cells. Through the signal power, function $C_i(x)$ is indirectly measurable at location x. In the denominator, $N(x)$ is used to account for the background noise including the thermal noise; the background noise is dependent of location x. Under the definition given above, $$N(x) = \sum_{j=1}^{n} V_j(x) - \sum_{j=1}^{n} y_j E_j(x) \quad (19)$$

Thus, while considering the pilot channel in an IS-95 system as an illustrative example, $N(x)$ also includes the interference from the traffic signals in the example.

Prior to the deployment of the network, the coverage area of each cell is usually defined according to the network plan, so that correspondence between any test measurement locations x and a radio frequency geographic coverage area (i.e. cell) can be identified except for the hand-off region. The purpose of the RF power allocation is to achieve at actual carrier-to-interference ratio meeting or minimally exceeding the target carrier-to-interference ratio in all coverage areas (i.e. cells) with a given probability. The target carrier-to-interference ratio may depend on the cell in which the test mobile station is momentarily located. A realistic assumption is $$C_i(x) \geq \begin{cases} C_i & \text{for } x \in S_i \\ 0 & \text{elsewhere} \end{cases} \quad (20)$$

for positive $C_i$'s, where $S_i$ refers to the area covered by cell i. In reality, the network operator is only concerned with measurement locations x that are relevant to the expected traffic. The test drive, as best illustrated in FIG. 3, preferably includes such measurement locations x. Consequently, $S_i$ refers to the measurement locations x of geographic region i rather than any potential location in the whole geographic region (i.e. cell). Now that the target carrier-to-interference ratio of $C_i$ is given, it follows from equation 18 that $$y_i \frac{1}{C_i} E_i(x) \geq \sum_{k=1}^{n} y_k E_k(x) + N(x) \quad (21)$$

for $x \in A_i$ with the only unknowns $y_1, y_2, \ldots, y_n$. The foregoing equation is the basic relation to begin the minimum-square error approach.

From equation 21 an equation and an inequality relation is obtained. One might first consider the equation and set the goal as finding $y_i$ such that the equation holds true. However, equation 21 cannot hold true for all x, because usually the domain contains more points x than the number of base station (transmitters) n. In other words, the equation does not have a solution in C(S), where C(S) refers to the set of continuous functions over the domain of $E_i(x)$, i=1, 2, . . . , n, and $N(x)$ $$S = \bigcup_{i=1}^{n} S_i, \qquad (22)$$

wherein S represents the route of the test drive over which one or more test receivers take measurements of the received signal at measurement locations x.

Instead of the above approach to solving equation 21, a solution in terms of the minimum-square error (MSE) between the left hand and the right hand of equation 21 can be found. Equation 21 may be solved with $L^2(S)$, the function space over S with Legesque $L^2$ norm, if the goal is changed to finding $y_i$, i=1, 2, ..., n that makes the following equation minimal:

$$\int_S \left| \frac{1}{C_i} y_i E_i(x) - \sum_{j=1}^{n} y_j E_j(x) - N(x) \right|^2 dx \qquad (23)$$

The necessary mathematical conditions of the minimum-square error can be found by differentiating equation 23 with respect to $y_i$ for i=1, 2, ..., n, resulting in:

$$\sum_{j=1}^{n} y_j \langle E_i | E_j \rangle + \langle E_i | N \rangle = \frac{1}{C_i} y_i \langle E_i | E_i \rangle \qquad (24)$$

for $C_i \neq 1$, where $$\langle E_i | E_j \rangle := \int_S E_i(x) E_j(x) dx \qquad (25)$$

If $\langle E_i | E_i \rangle \neq 0$, the equation 24 can be written in vector format as:

$$A \cdot y + z = y \qquad (26)$$

where $$y' = \{y_1, y_2, \ldots, y_n\}$$
$$z' = \{z_1, z_2, \ldots, z_n\}$$
$$A = \{a_{ij}\}$$

with $$z_i = \frac{C_i \langle E_i | N \rangle}{\langle E_i | E_i \rangle} \qquad (27)$$

and $$a_{ij} = \frac{C_i \langle E_i | E_j \rangle}{\langle E_i | E_i \rangle} \qquad (28)$$

As the power vector y is of primary concern as the solution of equation 26, the reasonable question to raise here is whether equation 24 has a solution, and if it does whether or not the solution is unique. The answer to this question may be based on the Fredholm alternative in Banach space, as set forth in L. Raade, B. Westergre, BETA: *Mathematics Handbook*, CRC Press, Boca 1992, pp. 264–267.:

Let K be a compact (integral) operator in Banach space B. Then the equation $$f - Kf = g \qquad (29)$$

has a unique solution f∈B for any g∈B if the equation $$f - Kf = 0 \qquad (30)$$

admits only the trivial solution f=0.

If equation 26 has a homogenous solution, then A=I. So, as long as this is not the case, the solution of equation 26 is unique. The solution can be expressed as $$y = (I - A)^{-1} \cdot z \qquad (31)$$

There are several methods of determining the inversion of I−A. However, from a practical point of view, inversion of matrix presents an absolutist yes-or-no solution. The inversion matrix may not provide an pragmatic result intermediate between the extremes. Because the result of solving the inversion matrix may not be adequate for engineers and technicians of wireless service providers, an iteration algorithm is well-suited for obtaining the resultant downlink transmit powers as a system-wide solution for each base station.

The requirement that $\|A\| < 1$ implies the convergence of the Neumann's series:
The limit of the partial sum $$\lim_{k \to \infty} \sum_{i=0}^{k} A^i \cdot z \qquad (32)$$

exists, when the operator norm is less than unit, i.e. $\|A\| < 1$. This limit of the partial sum represents a basic result of the functional analysis and can be found for instance in Theorem 3.48 in R. Kress, *Numerical Analysis*, Springer, Verlag, New York, 1998, pp. 46–47. The following proposition follows, assuming $C_i \neq 1$ and $\langle E_i | E_i \rangle \neq 0$ for all i=1, 2, ... n, so that $\|A\| < 1$.
Then the series $$y^{(k)} = z + A \cdot y^{(k-1)} \qquad (33)$$

converges for k→∞ and the limit $$\lim_{k \to \infty} y^{(k)} = : y \qquad (34)$$

is the least square solution to equation 21. The above relationship is proved in the following manner. From equation 26, the iteration of equation 33 can be constructed, or the partial sum $$y^{(k)} = \sum_{i=0}^{k} A^i \cdot z \qquad (35)$$

the existence of the $\lim_{k \to \infty} y^{(k)}$ follows from equation 32. Because equation 26 results from the least square minimization of difference between the left hand and the right hand of equation 21, the solution of equation 26 is the minimum-square error solution to equation 21.

Equation 26 leads to a result that minimizes the difference between the left hand and the right hand of equation 21 in $L^2$ norm. In other words, among all possible $\{y_i E_i(x)\}$ that can be found in $L^2(S)$, y generates the set that induces "in average" the smallest square difference between the left and the right hand of equation 21.

In reality, the carrier-to-interference ratio defined by equation 18 is always less than unitary. So is the target C/I value $C_i$. Thus, the condition $C_i \neq 1$ is fulfilled. The second condition $\langle E_i | E_i \rangle \neq 0$ is also satisfied, because $E_i$ is the received signal power for unit transmit power. Still, there is the question when is the condition $\|A\|<1$ true. From the functional analysis, it is known that the spectral radius that determines the norm of the operator. The spectral radius is given by the maximum of the eigen values, hence $$\|A\|=\max(|\lambda|:\lambda \text{ eigenvalues of } A) \quad (36)$$

To avoid the labor of finding the eigen values, it is in many situations sufficient to know the upper bound, e.g. given in R. Kress, *Numerical Analysis*, Springer Verlag, New York, 1998, pp. 46–47.

$$\|A\| \leq \left\{\sum_{i,j=1}^{n} a_{ij}^2\right\}^{1/2}. \quad (37)$$

Roughly speaking, the smaller the $a_{ij}$s, the higher the chance, that the iteration converges. That means, the small values of $a_{ij}$ indicates a higher practical chance that the minimum-square error problem can be solved. This behavior of the equation 26 has deeper implication to the network quality. This can be seen by introducing a normalization of the propagation factor in the following equation:

$$u_i(x) = \frac{E_i(x)}{\|E_i\|} \quad (38)$$

where $\|E\|=\sqrt{\langle E_i|E_i\rangle}$ is the $L^2$-norm of $E_i$. Thus, $u_i$ is the normalized propagation factor, the matrix and the vector can be written in $$a_{ij} = C_i \langle u_i | u_j \rangle \frac{\|E_j\|}{\|E_i\|} \quad (39)$$

$$z_i = C_i \langle u_i | n \rangle \frac{\|N\|}{\|E_i\|} \quad (40)$$

where $n=N(x)/\|N\|$. By doing so, each matrix element is decomposed into two independent parts. The term $\langle u_i|u_j\rangle$ depends only on the distribution of the normalized propagation factor, not on its absolute value. This is the product of $u_i$ and $u_j$. Because $\langle u_i|u_j\rangle$ is independent of the downlink transmit power of the base station, $\langle u_i|u_j\rangle$ can be modified or improved by the orientation of the base station antennae rather than adjustment of the transmitter power. Hence, the quality of the network design can be measured by looking at the orthogonality property.

The normalized propagation factor $u_i$ is a distribution function, describing how the radiated energy of base station i is distributed along the test route S, hence $$\langle u_i|u_j\rangle \leq 1 \quad (41)$$

where the equal sign holds when i=j. But, if the equal sign holds when i≠j, then $u_i=u_j$. Physically, the foregoing case means the virtually complete redundancy of the radio frequency coverage of two base stations. On the other hand, if $$\langle u_i|u_j\rangle = \delta_{ij} \quad (42)$$

where $\delta_{ij}$ is the Kronecker's symbol with $\delta_{i,j}=0$ for i≠j and $\delta_{i,i}=1$, then $$a_{ij}=\delta_{i,j}C_i. \quad (43)$$

Since $\|A\|<=\max_{i=1}^{n} C_i$, one can assert when $C_i$ for all i=1, 2, ..., n, equation 26 can be solved by iteration of equation 33 if equation 42 is true. Condition equation 42 expresses radio frequency coverage orthogonality. An example of a network fulfilling coverage orthogonality is $$E_i(x) = \begin{cases} E_i^0 & x \in S_i \\ 0 & x \in S_i \end{cases} \quad (44)$$

with $E^0_i>0$. In the ideal coverage of any RF network, each cell is covered by the corresponding base station only until the cell boundary. That is, after a mobile station transgresses the cell boundary, the base station ideally would no longer provide a signal to the mobile station such that a discrete cell boundary existed.

However, in reality all signals transmitted by a base station will reach, albeit weaker, beyond the cell boundary, as a result of electromagnetic propagation of the downlink transmit signal. The downlink transmit signal power decays gradually and the coverage orthogonality only represents a mathematical idealization. Obviously, the reality lies between the extremes of complete redundancy (i.e. unwanted overlapping radio frequency coverage) and the coverage orthogonality, i.e. between $\langle u_i|u_j\rangle=1$ and $\langle u_i|u_j\rangle=\delta_{ij}$. Consequently, the coverage orthogonality can be used as a measure for the radio frequency performance of the wireless network: the smaller $\langle u_i|u_j\rangle$ for j≠i, the better the wireless network. So, A of a good network has a diagonal or quasi diagonal structure.

Besides the product $\langle u_i|u_j\rangle$, the term $$\frac{\|E_j\|}{\|E_i\|} \quad (45)$$

in equation 40 also contains information about the wireless network. It indicates the balance of the network with respect to the coverage of its base stations. The ratio is unitary when the network is balanced, where no base station dominates the whole network and $\|E_i\|$ is constant for all geographic coverage regions i. Then, the matrix depends only on $\langle u_i|u_j\rangle$ and $\langle u_i|u_j\rangle$ is power independent for a resultant downlink transmit power. In reality, $\|E_i\|$ is different for different base station i due to the propagational environment and the measurement locations.

Next, the ratio $\langle u_i|u_j\rangle$ is inspected more closely, to see its value in relation to the convergence of iteration of equation 33. The relationship between the ratio and the convergence can partly be retrieved from the upper bound of the operator norm of A. The upper bound of $\|A\|$, as given by equation 37, can be written in terms of the normalized functions:

$$\sqrt{\sum_{i,j=1}^{n} C_i^2 \langle u_i | u_j \rangle^2 \frac{\|E_j\|^2}{\|E_i\|^2}} := UB \quad (46)$$

The smaller the upper bound, the smaller the operator norm and the better the convergence of the iteration algorithm. An objective is to find the conditions when UB becomes minimum.

In reality, $C_i$ is given and fixed, and $\langle u_i|u_j\rangle$ is fixed and cannot be changed without redesigning the wireless network. Thus, the parameter to be tuned is the downlink transmit power. The foregoing minimum can be reached when radiated energies of base stations, summed over the measurement locations x, are the same for i=1, 2, ..., n. Precisely, for a given $C_i$ and $\langle u_i|u_j\rangle$, i,j=1, 2, ..., n, the upper bound UB of the operator norm $\|A\|$ reaches minimum, when $$\|E_j\|=\|E_i\| \quad (47)$$

for all i and j.
Equation 47 is proved as follows. Since $\langle u_i|u_j\rangle = \langle u_j|u_i\rangle$, there are $n(n-1)/2$ terms of $$a_{ij}^2 + a_{ji}^2 = \langle u_i|u_j\rangle^2\left\{C_i^2\left(\frac{\|E_j\|}{\|E_i\|}\right)^2 + C_j^2\left(\frac{\|E_i\|}{\|E_j\|}\right)^2\right\} \quad (48)$$

in UB, where $i \neq j$. Let $\|E_j\|^2 = \|E_i\|^2 + \epsilon$, then $$a_{ij}^2 + a_{ji}^2 = \langle u_i|u_j\rangle^2\left\{C_i^2 + C_j^2 + \epsilon\left(\frac{1}{\|E_i\|^2} - \frac{1}{\|E_j\|^2}\right)\right\}. \quad (49)$$

If $\|E_i\| > \|E_j\|$, then the term following $\epsilon$ is negative. But at the same time, $\epsilon < 0$ due to the definition. Thus, $$a_{ij}^2 + a_{ji}^2 = \langle u_i|u_j\rangle^2\left\{C_i^2 + C_j^2 + \left|\epsilon\left(\frac{1}{\|E_i\|^2} - \frac{1}{\|E_j\|^2}\right)\right|\right\}. \quad (50)$$

So, it reaches minimum, when $\epsilon=0$.

The solution of equation 26 presents a mere minimum-square error solution of the equation in equation 21, and, as such, it does not make equation 21 equal for all x. Roughly speaking, having applied the minimum-square error solution $y_i$, $i=1, 2, \ldots, n$, to equation 21, it is still equally probable to find:

$$y_i \frac{1}{C_i} E_i(x) < \sum_{k=1}^{n} y_k E_k(x) + N(x) \quad \text{and} \quad (51)$$

$$y_i \frac{1}{C_i} E_i(x) > \sum_{k=1}^{n} y_k E_k(x) + N(x) \quad (52)$$

Therefore, the minimum-square error solution achieves a "fair" distribution of the deviation of the carrier-to-interference around the target values $C_i$ for $i=1, 2, \ldots, n$. The ultimate goal, however, is that equation 21 be fulfilled as much as possible. With respect to y of equation 26, only a fair re-distribution of carrier-to-interference ratio is obtained. The final goal can be reached by an additional step, in which the carrier-to-interference level shall be adjusted uniformly toward equation 21 for all $i=1, 2, \ldots, n$. This can be done, for instance, by changing the target carrier-to-interference value $C_i$, so that it lies above or beneath the actual threshold, which enables the fulfillment of equation 21. But this approach is limited by the fact that $C_i$ is fixed and less that unit.

In order to find a feasible method to reach the target carrier-to-interference, let us look at the inequality of equation 21. Consistent with previous arguments, the following equation ensues:

$$y \geq z + A \cdot y \quad (53)$$

Thus, it turns out that the solution y of equation 26 is the lower bound of the solutions of equation 53. Let $$C_i(x, \alpha) := \frac{\alpha y_i E_i(x)}{N(x) + \sum_{j=1}^{n} \alpha y_j E_j(x)} \quad (54)$$

It is found that:

$$C_i(x, \alpha) > \frac{y_i E_i(x)}{N(x) + \sum_{j=1}^{n} y_j E_j(x)} \quad (55)$$

for $\alpha > 1$ and $$C_i(x, \alpha) < \frac{y_i E_i(x)}{N(x) + \sum_{j=1}^{n} y_j E_j(x)} \quad (56)$$

for $\alpha < 1$. Thus, the result can be correspondingly calibrated by replacing y by $\alpha y$ with $\alpha > 0$. Function $C_i(x,\alpha)$ is positive for positive $\alpha$. It can be easily confirmed that $C_i(x,\alpha)$ has no maximum for $\alpha \in [0,\infty]$ and for all x. $C_i(x,\alpha)$ is a monotone increasing function of $\alpha \in [0,\infty]$ and its range is $[0,1]$ with:

$$\lim_{\alpha \to \infty} C_i(x, \alpha) = \frac{y_i E_i(x)}{\sum_{j=1}^{n} y_j E_j(x)} \leq 1. \quad (57)$$

One method to determine $\alpha$ is to solve the equation:

$$C_i(x,\alpha) = C_i \quad (58)$$

for $\alpha$, and obtain:

$$F_i(x) = \frac{C_i N(x)}{y_i E_i(x) - C_i \sum_{j=1}^{n} y_j E_j(x)} \quad (59)$$

Then, let $\alpha$ be $\max_{i=1}^{n} \max_{x \in S_i} F_i(x)$ with respect to i. If $y_i$ is the minimum-square error solution of equation 21 with $y_i E_i(x) > 0$, $i=1, 2, \ldots, n$, and $N(x) > 0$ for all x, and if:

$$F_i = \max_{x \in S_i} \frac{C_i \cdot N(x)}{y_i E_i(x) - C_i \sum_{j=1}^{n} y_j E_j(x)} \quad (60)$$

exists, then equation 21 holds true, when $y_i$ is replaced by $$y_i \cdot \max_{i=1}^{n} F_i \quad (61)$$

with $i=1, 2, \ldots, n$.
The foregoing relationship may be proved by considering $$\frac{N(x)}{\max_{i=1}^{n} F_i} \leq \frac{N(x)}{F_i} \leq \frac{N(x)}{F_i(x)} \quad (62)$$

for all x and $i=1, 2, \ldots, n$, one obtains $$C_i\left(\max_{i=1}^{n} F_i, x\right) = \quad (63)$$

$$\frac{y_i E_i(x)}{N(x)/\max_{i=1}^{n} F_i + \sum_{j=1}^{n} y_j E_j(x)} \geq \frac{y_i E_i(x)}{N(x)/F_i(x) + \sum_{j=1}^{n} y_j E_j(x)} = C_i$$

owing to $N(x) > 0$ and $y_i E_i(x) > 0$ for all x and $i=1, 2, \ldots, n$.

In reality, each transmitter power is limited by a given maximum value, say $Y^M_i$. A realistic $\alpha$ must take account of this limitation. Therefore, let $Y^M_i$ be the maximal power available for base station i=1, 2, . . . , n. Then, a realistic assessment of the resultant power is given by $\alpha \cdot y_i$ with:

$$\alpha := \min_{i=1}^{n}\left\{\frac{y_i^M}{y_i}, \max_{i=1}^{n} F_i\right\}, \tag{64}$$

Equation 64 is provable by showing that $\alpha \cdot y_i$ is either mathematically optimal or that $\alpha \cdot y_i$ mathematically represents an optimal value among all feasible values. Let $$\alpha_0 = \max_{i=1}^{n} F_i \tag{65}$$

If $\alpha = \alpha_0$, then:

$$y_i \alpha \le y_i \cdot \frac{y_i^M}{y_i} \le y_i^M \tag{66}$$

is mathematically optimal and feasible. On the other hand, if $\alpha \ne \alpha_0$, there is at least one i, such that $$\frac{y_i^M}{y_i} < \min\left\{\alpha_0, \frac{y_j^M}{y_j} \text{ for } j = 1, 2, \ldots, n; j \ne i\right\} \tag{67}$$

Upon consideration of equation 67, equation 58 is not satisfied for all x. That is, a $\alpha \cdot y_i$ is not mathematically optimal. But $$y_j \alpha \le y_j \cdot \frac{y_i^M}{y_i} < y_j \cdot \frac{y_j^M}{y_j} = y_j^M \tag{68}$$

or all j=1, 2, . . . , n, i.e., is still feasible. Because of equation 67, $\alpha \cdot y_i$ represents mathematically optimal choice among all feasible choices.

Another concern regarding the network power allocation method is based on equation 33 is the convergence. If the network is designed and installed so poorly that the partial sum of equation 33 does not converge, a viable alternative is needed for determining the downlink transmit powers of the base stations.

The minimum-square error solution comes from the minimization of left and right side of equation 21 in $L^2(S)$, where S is the union of the area of all cells. Now, instead of entire domain of S, the procedure is confined the scope to each cell $S_i$, while coping with the C/I of that cell. Restricting the procedure to the scope of each cell $S_i$ is supported by the fact, that $y_i E_i(x)$ should dominate only in cell i. In other cells, say j, signal power of $y_i E_i(x)$ becomes interference and needs to be suppressed. Despite the fact that no $E_i(x)$ can be tuned on a local basis, an attempt may be made to find a quantity that can be used for the approximate estimation. For this purpose, the following inequality is examined, $$\sum_{j\ne i} y_j E_j^{M,i} + N^{M,i} \le \left(\frac{1}{C_i} - 1\right) y_i E_i^{m,i} \tag{69}$$

where $$E_j^{M,k} = \max_{x \in S_k} E_j(x) \tag{7}$$

-continued $$E_i^{m,k} = \min_{x \in S_k} E_i(x) \tag{8}$$

$$N^{M,i} = \max_{x \in S_i} N(x) \tag{9}$$

wherein $y_i$ is a known downlink power of base station i, $C_i$ represents a carrier-to-interference ratio for a defined coverage area, $E_i(x)$ is a propagation factor for first set of defined coverage areas i, $E_j(x)$ is a propagation factor for a second set of defined coverage areas distinct from the first set, N(x) represents background noise, m is the considered (e.g., total) number of measurement locations x, and k represents a particular measurement location. If $E_j^{M,i}$, $E_i^{m,i}$ and $N^{M,i}$ exist so that equation 69 is true, then equation 21 holds, too. In fact, equation 69 is a tighter relation than equation 21. It suffices to consider the equation in equation 69, from which one obtains $$y_i = \frac{C_i}{1 - C_i} \frac{N^{M,i} + \sum_{j\ne i} y_j E_j^{M,i}}{E_i^{m,i}} \tag{70}$$

The foregoing expression contains unknowns $y_j$ on the right. For clarity, the foregoing expression can be rewritten as the following equation:

$$y_i \cdot (1 - C_i) \frac{N^{M,i} + \sum_{j\ne i} E_j^{M,i}}{N^{M,i} + \sum_{j\ne i} y_j E_j^{M,i}} = C_i \cdot \frac{N^{M,i} + \sum_{j\ne i} E_j^{M,i}}{E_i^{m,i}} \tag{71}$$

The right side of equation 71 does not depend on $y_j$. The left side, $C_i$, in units of watts, is very small compared to one, typically −5 dB. From experience, the power power allocation affects the distribution of the interference power among i than the sum:

$$\sum_{j\ne i} E_j^{M,i} \approx \sum_{j\ne i} y_j E_j^{M,i} \tag{72}$$

in cell $S_i$. Thus, the following estimation $$y_1'^*(1 - C_i) \frac{N^{M,i} + \sum_{j\ne i} E_j^{M,i}}{N^{M,i} + \sum_{j\ne i} y_j E_j^{M,i}} \approx 1 \tag{73}$$

can be assumed. From the tighter relation equation 69 follows $$y_i \approx C_i \cdot \frac{N^{M,i} + \sum_{j\ne i} E_j^{M,i}}{E_j^{m,i}}. \tag{6}$$

This is the result of approximation of equation 21 under the premise that equation 69 exists and equation 73 is justifiable.

One advantage of equation 6 is that the calculation of $y_i$ requires only local data, i.e. measured data at $S_i$. Therefore, equation 6 is simple and easy to use, particularly when the analytical algorithm fails. The physical interpretation of equation 6 is plausible, if the equation is considered in decibels (dB) as follows.:

$$10\log(y_i) = 10\log(C_i) - 10\min_{x \in S_i}\log[C_i(x, 1)] = C_i^{dB} - \min_{x \in S_i} C_i^{dB}(x, 1) \quad (74)$$

The resultant power value is just the difference between the target carrier-to-interference value and the actual carrier-to-interference value by unit power.

Procedure for Measuring Signal Parameters

FIG. 3 shows an illustrative example of measuring the received signal powers in step S10. FIG. 3 depicts an illustrative wireless network 114 including four base stations that are centrally located in four corresponding hexagonal cells 100. Each hexagonal cell 100 represents the radio frequency coverage of the corresponding base station centrally located within the hexagonal cell 100.

The base stations may be located with reference to an x axis and a y axis as shown. A first base station 102 has the x, y coordinates 4 km, 0 km, respectively. A second base station 104 has the x, y coordinates 0 km, 4 km, respectively. A third base station 106 has the x, y coordinates −4 km, 0 km, respectively. A fourth base station 108 has the x, y coordinates 0 km, −4 km, respectively.

While a test route 110 through each radio frequency coverage area is shown as an elliptical path, a path with any shape, regardless of whether it is continuous or discontinuous may be used. The measurement locations x (112) may be located on the path of the test drive such that a statistically significant sample of test measurements are attained in each radio frequency coverage area. The measurement locations 112 may coincide with areas of anticipated heavy traffic or of critical importance to subscribers of the wireless communications network.

As shown in FIG. 3, the test route 110 is designed such that it goes through each cell 100. The test route 110 is a ellipse with a center that coincides with the origin 116 of the above coordinate system and the center of the square defined by the base stations. In the 4 Km inter-site spacing of the above example, the long (x-direction) and short (y-direction) axes of the ellipse are approximately 10 km and 3 km, respectively. While in theory the progression through the measurement points may proceed by moving a test receiver along the elliptical test route 110 in an clock-wise or counter-clockwise nature, in practice an actual test drive may be limited to the local roads and highway system to appropriately limit the expense of the measurement process. The wireless network 114 may be subject to background noise and radio frequency slow fading with a characteristic deviation (e.g., 8 dB). There is no restriction as to whether the measurements are made simultaneously at all locations with multiple test receivers or sequentially with a single test receiver moving along a route that intercepts the measurement locations 112.

As shown in FIG. 4, in an example, step S12 includes organizing the determined propagation factors into a propagation factor matrix including respective propagation factors for each base station at the measurement locations 112. The propagation factor matrix may have columns representing uniform base station identifiers and rows representing uniform measurement locations 112. Each entry in the propagation factor matrix may be determined in accordance with equation 1.

Figure 5:
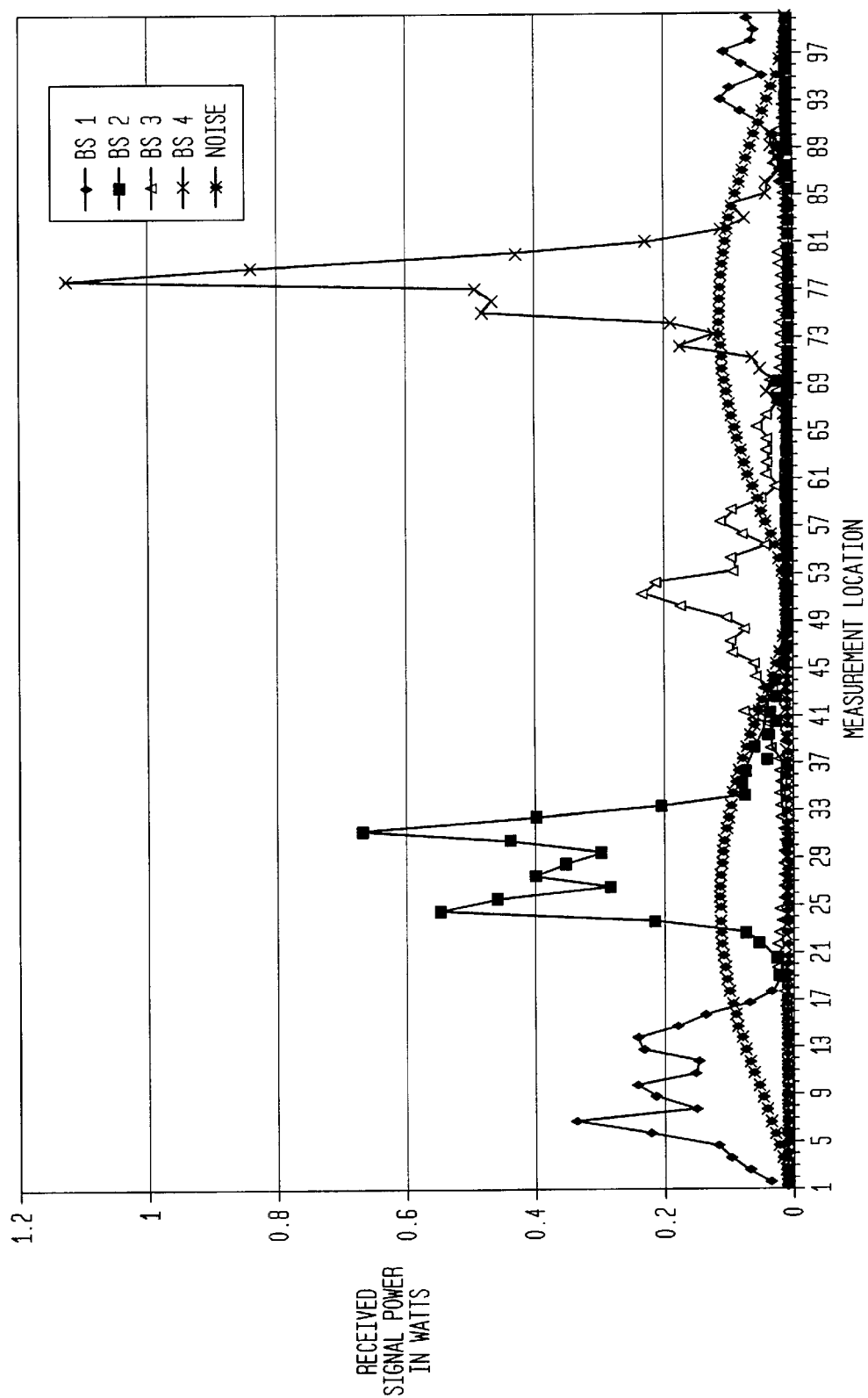
FIG. 5 shows a received signal power at various measurement locations for the wireless network of FIG. 3 prior to adjusting downlink transmit power in accordance with the invention.
Figure 6:
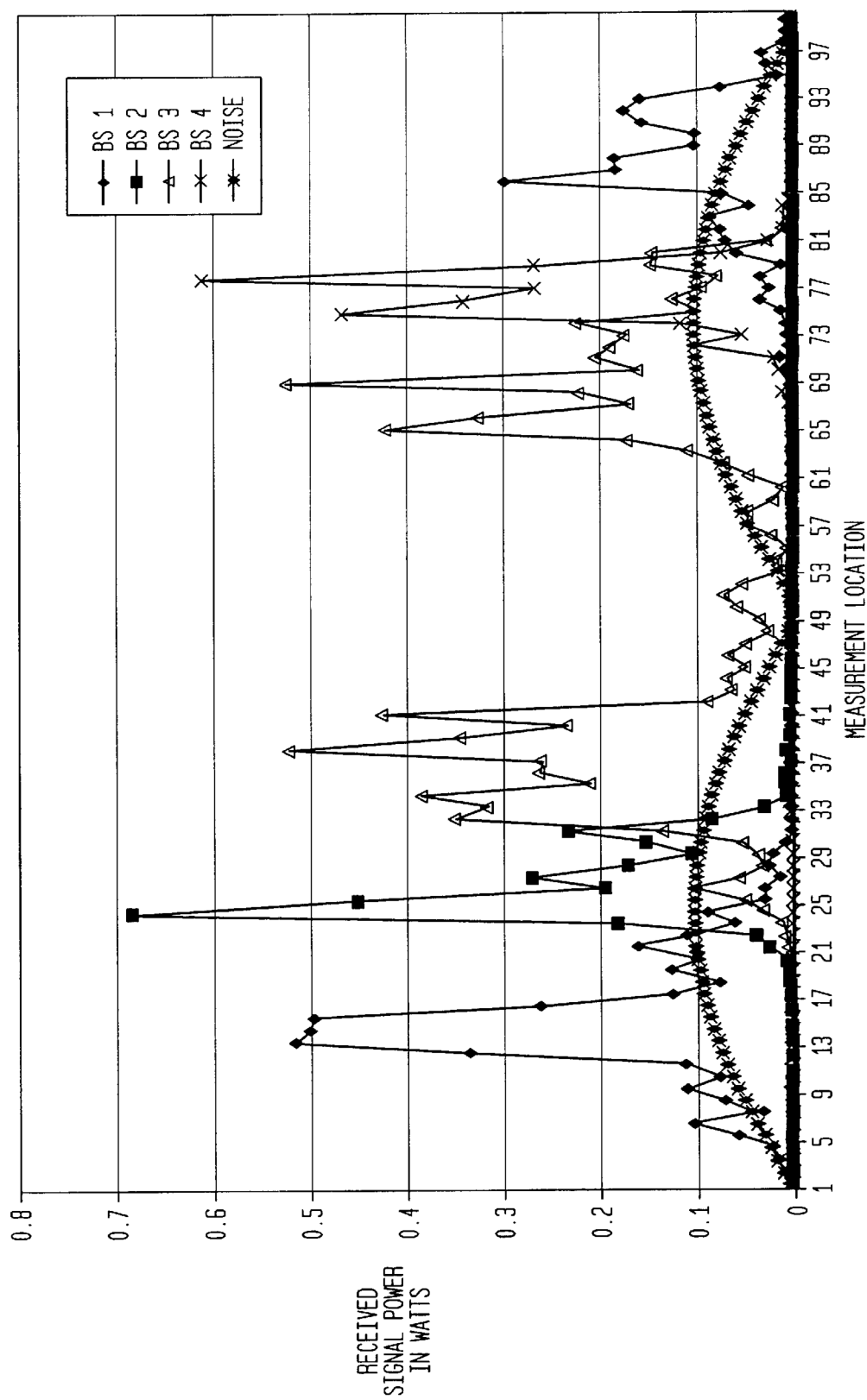
FIG. 6 shows a received signal power at various measurement locations for the wireless network of FIG. 3 after adjusting downlink transmit power in accordance with the invention.

Computer-Simulated Estimates of Potential Performance Improvement of a Wireless Network FIG. 5 represents the measured downlink transmit signal power within the hypothetical (e.g., computer-simulated) wireless network of FIG. 3 prior to the adjustment (e.g., power allocation) method of the present invention. In contrast, FIG. 6 represents the measured downlink signal power within the hypothetical wireless network of FIG. 3 after conducting the adjustment (e.g., power allocation) method of the invention. FIG. 6 includes base stations adjusted to the resultant downlink transmit powers, whereas FIG. 5 does not. In both FIG. 5 and FIG. 6, the vertical axis shows transmitted downlink power in watts, whereas the horizontal axis represents various measurement locations 112, which include measurement locations 112 for illustrative purposes. The downlink transmit power of each base station is plotted as a distinct curve as received at the measurement locations 112. A first base station 102 is represented by a rotated rectangle symbol. A second base station 104 is represented by a ordinary rectangle symbol. A third base station 106 is represented by a triangular symbol. A fourth base station 108 is represented by an "x".

After power allocation as shown in FIG. 6, some of the downlink transmit signals are stronger than prior to power allocation such that the actual carrier-to-interference at all selected measurement locations 112 meets or just exceeds a target carrier-to interference level.

Figure 7:
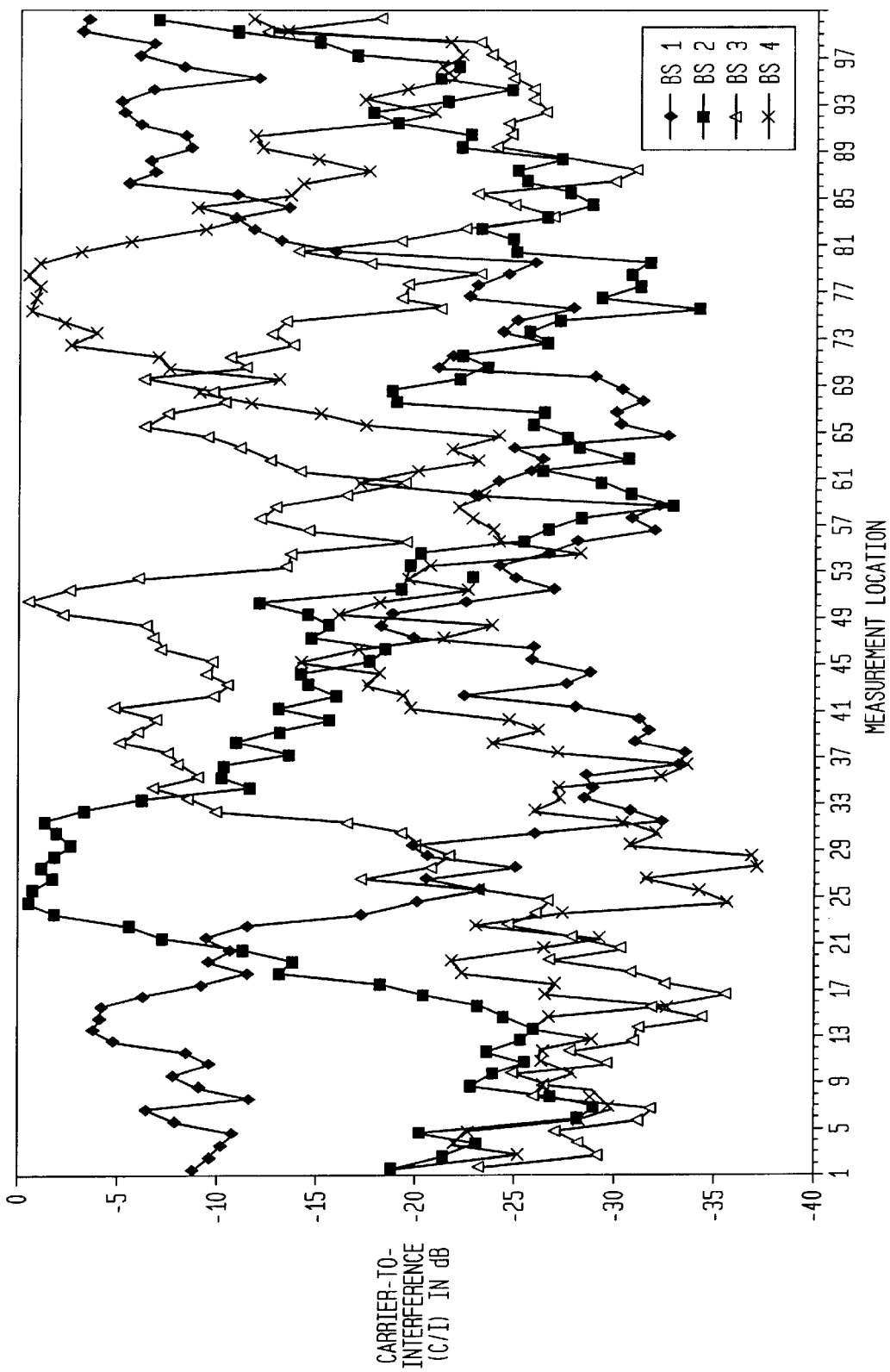
FIG. 7 shows the received carrier-to-interference ratio at various measurement locations for the wireless network of FIG. 3 prior to adjusting downlink transmit power in accordance with the invention.
Figure 8:
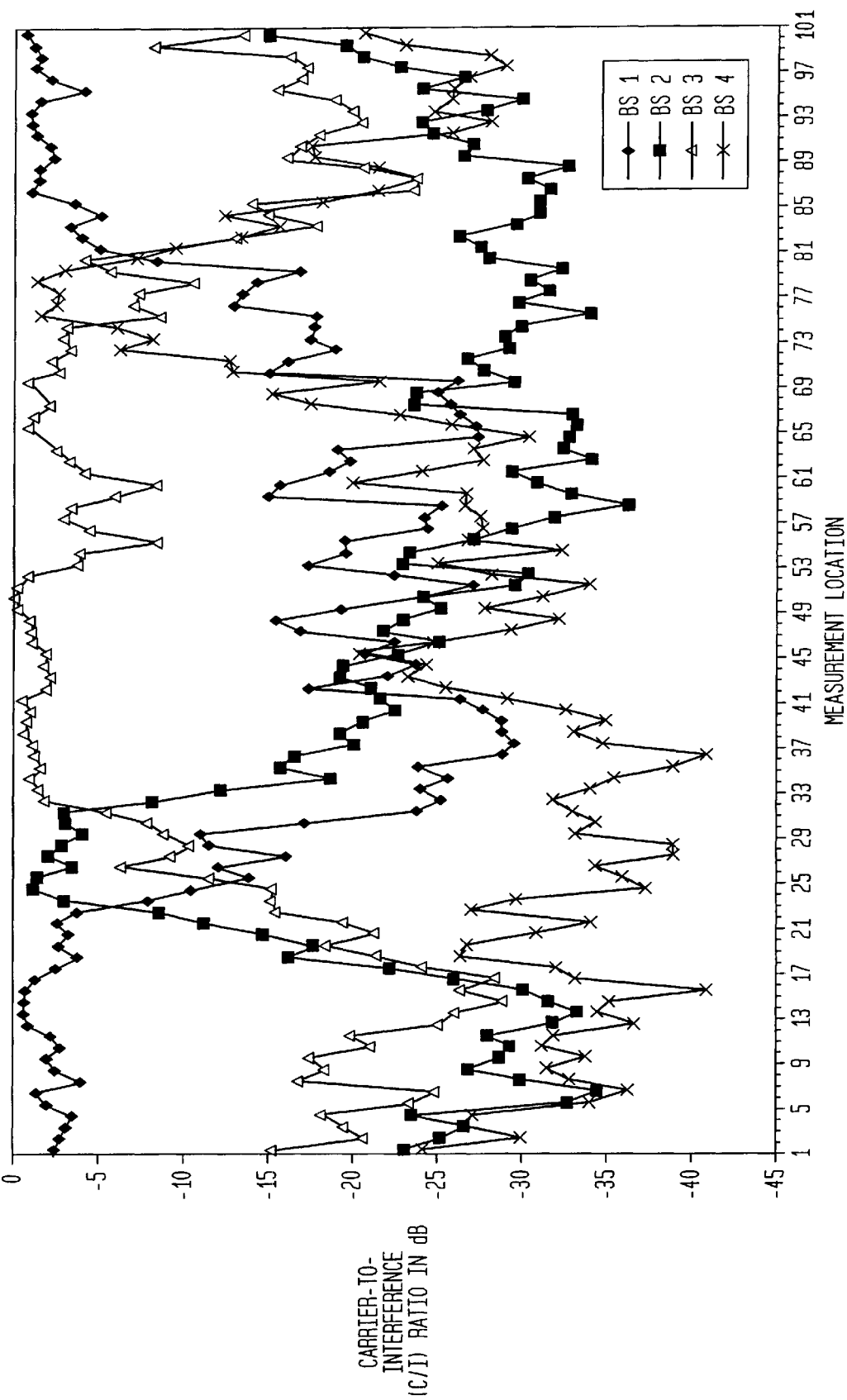
FIG. 8 shows the received carrier-to-interference ratio at various measurement locations for the wireless network of FIG. 3 after adjusting downlink transmit power in accordance with the invention.

FIG. 7 and FIG. 8 are a pre-adjustment and post power-adjustment graph of carrier-to-noise ratio, respectively. FIG. 7 and FIG. 8 reflect the hypothetical characteristics of the inter-site spacing and the geometry of the test route 110 previously described in conjunction with FIG. 3, although the actual inter-site spacing and the geometry depends on the particular attributes of any wireless network to which the adjustment method is applied. Carrier-to-noise ratio or radio frequency signal-to-noise ratio is a better indication of system performance than merely downlink transmit power as expressed in FIG. 5 and FIG. 6 because maximum performance and subscriber capacity of the wireless network may depend upon minimizing noise. FIG. 7 and FIG. 8 use the same representational symbols for the first, second, third, and fourth base stations as FIG. 5 and FIG. 6. Although each of the base stations may include an omnidirectional antenna as illustrated by the polygonal cells of FIG. 3, an alternate embodiment may include at least one directional antenna coupled to any base station. Further, the vertical axis shows carrier-to-interference ratio in dB, whereas the horizontal axis shows measurement locations 112.

FIG. 7 and FIG. 8 include background noise and slow fading that blur the reception of a loaded wireless network. The received carrier-to-interference ratio is simultaneously recorded from all four base stations. The carrier-to-interference value varies from location-to-location, and from cell-to-cell, where each cell is identified by a dominant base station.

If for purposes of an illustrative example, the target carrier-to-interference for the wireless network is at the negative 5 dB level, the improvement between the pre-adjustment and the post power-adjustment graph is readily apparent. In the pre-adjustment graph of FIG. 7 only measurement location numbers 23–33 satisfied the target carrier-to-interference ratio for the second base station 104; only measurement location numbers 49–52 satisfied the target carrier-to-interference ratio for the third base station 106; only measurement location numbers 72–81 satisfied the target carrier-to-interference ratio for the fourth base station 108. Thus, the communications service provided to measurement location numbers 1–22, 34–48, 53–71, and 82–100 has an inadequate carrier-to-interference ratio.

In contrast, in the post power-adjustment graph of FIG. 8, substantially all of the measurement location numbers 1–100 are served with adequate carrier-to-interference ratios by the base stations. In particular, the first, second, third and fourth base stations each have some measurement locations 112 exceeding the target carrier-to-interference ratio of −5 dB.

In terms of a statistical requirement, the minimum performance requirement for the network of this example is −5 dB with a probability of 0.9. The pre-adjustment graph of FIG. 7 does not attain the statistical requirement, but the post power-adjustment graph of FIG. 8 does. After adjusting the downlink transmit power of the base stations to the resultant downlink transmit power, the post power-adjustment graph, reveals that more than 95 percent of carrier-to-interference ratios for the cells are above the target threshold.

FIG. 7 and FIG. 8 could represent, for example, a test receiver's measurements of the carrier-to-interference ratio for the pilot channels of each cell on a test drive route through a CDMA network. The pilot channel in IS-95 is typically transmitted with the maximum available downlink power in conformance with the resultant downlink transmit power.

Power Allocation System

Figure 9:
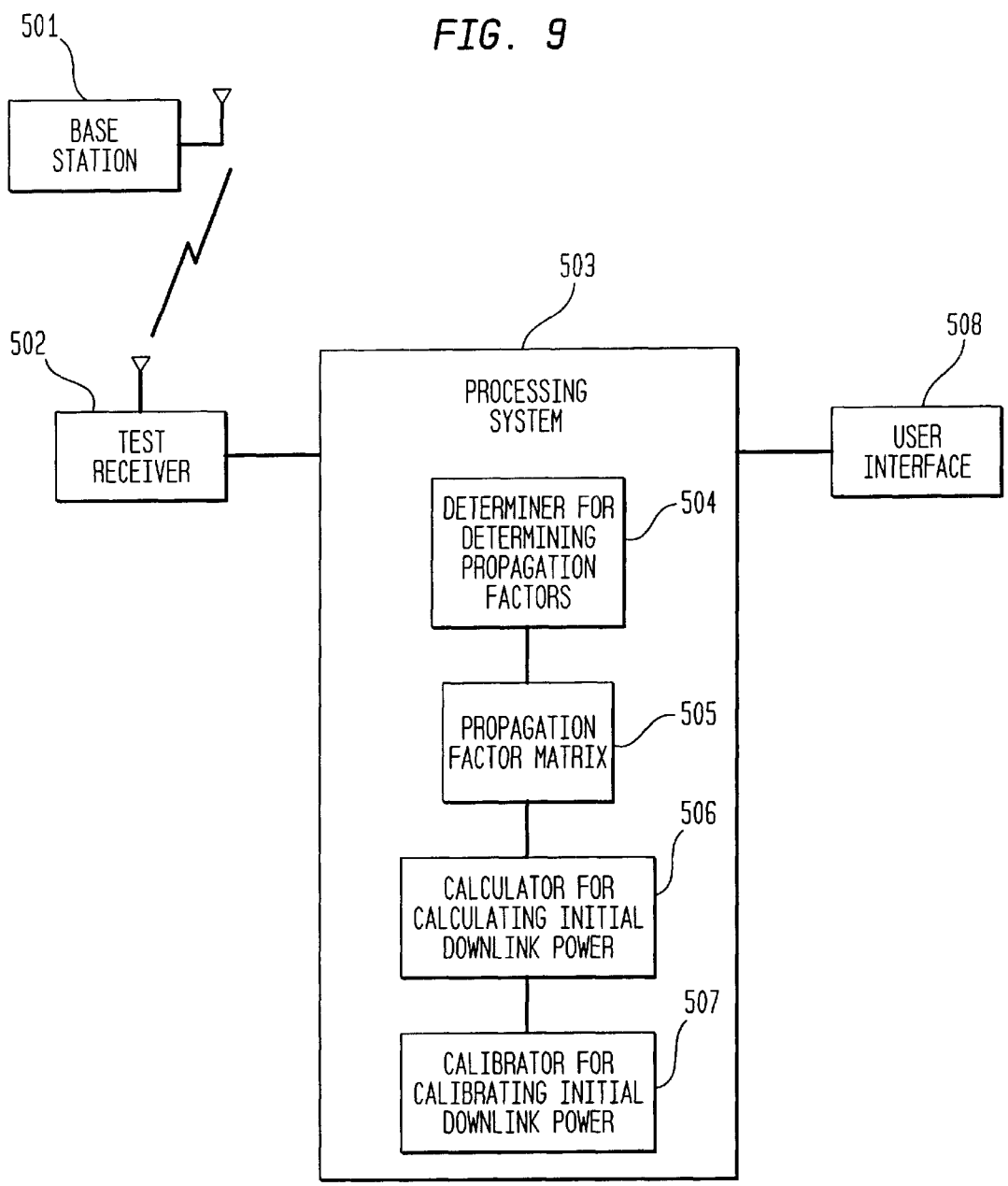
FIG. 9 shows an illustrative system for allocating downlink power to base stations in a wireless network.

FIG. 9 discloses a system for allocating downlink transmit power that may be used to practice any power allocation method disclosed herein. The power allocation system includes a test receiver 502 coupled to a processing system 503 and a user interface 508 coupled to the processing system 503. The test receiver 502 measures electromagnetic transmissions from one or more base stations 501 as previously described. The user interface 508 allows a user to define one or more of the following: target performance goals, target carrier-to-interference ratios, and defined reliabilities. The processing system 503 accepts input from the user interface 508 and the test receiver 502 to determine a constellation (e.g., a system-wide set) of resultant downlink transmit powers for the base stations 501 in the wireless network over the measurement locations. The processing system 503 determines the constellation such that system-wide interference; particularly, co-channel interference is minimized or otherwise reduced.

The test receiver 502 measures received signal parameters (e.g., signal strengths), of electromagnetic transmissions from the base stations 501, at measurement locations within defined radio frequency coverage areas. The test receiver 502 may be capable of measuring background noise associated with each of the measurement locations. The measured background noise is within a frequency range of the electromagnetic transmissions.

The processing system 503 includes a determiner 504 for determining propagation factors and a calculator 506 for calculating initial downlink transmit powers for the base stations 501. The propagation factors are associated with the electromagnetic transmissions as a function of the measurement locations. The initial downlink transmit powers generally are within the bounds of the transmitter power intervals based upon the propagation factors and at least one target performance goal for the coverage areas.

In an alternate embodiment, the determiner 504 is arranged to determine a propagation factor matrix 505 including respective propagation factors for at least one propagational path between each measurement location and a corresponding base station 501. The propagation factor matrix 505 may have columns representing uniform base station 501 identifiers and rows representing uniform measurement locations.

The calculator 506 is arranged to calculate the initial downlink transmit power for each of the base stations 501 based upon the measured signal parameters (e.g., signal strength, measured background noise, or both) the propagation factors, and a target carrier-to-interference ratio as the target performance goal. In an alternate embodiment, the measured signal parameters may comprise signal-to-noise ratio, signal-to-interference ratio, frame-error rate, bit-error rate, or the like.

The processing system 503 may further include a calibrator 507 for calibrating the initial downlink transmit powers to obtain the constellation of the resultant downlink transmit powers. The resultant downlink transmit powers satisfy a target carrier-to-interference ratio as the target performance goal for the measurement locations with a defined reliability. The initial downlink transmit powers are used to derive resultant downlink transmit powers with corresponding actual carrier-to-interference ratios meeting or minimally exceeding a target carrier-to-interference ratio as the target performance goal for the measurement locations with a defined reliability. The calibrator 507 may calibrate the initial downlink transmit powers by considering a known maximum transmit power of each of the base stations 501. The processing system 503 is adapted to establish the defined reliability as a percentage of time in a coverage area during which the target-to-carrier interference ratio is met or exceeded.

Application of the Power Allocation Method

Any power allocation method disclosed herein may be applied to the power allocation of wireless networks, such as code-division multiple access (CDMA), frequency-division multiple access (FDMA), and time-division multiple access (TDMA), among others. In an interference-limited wireless network, an appropriate transmit-power allocation of the downlink power is essential for achieving the expected service quality of the network. Particularly, the power levels of beacon channels are crucial for radio frequency coverage and efficient hand-offs. The power levels of beacon channels and traffic channels may be subjected to radio frequency power allocation in accordance with the invention to attain or approach the most efficient use of limited spectral resources.

A wireless network, such as a cellular radio network, provides traffic capacity through the reuse of frequency resources. As a result of frequency reuse, carrier signals are always subject to interference, which is measured by the carrier-to-interference ratio (C/I). The carrier-to-interference ratio is the ratio of the carrier signal power to the sum of all other signals received at the same frequency. The carrier-to-interference ratio represents a measure of signal-to-noise that serves as quality indicator equally well for (code-division multiple access) CDMA system and (time-division multiple access) TDMA system.

In order to achieve sufficient carrier-to-interference for the traffic channels, both CDMA and TDMA systems have introduced the power control mechanisms, which allows for the base station and the mobile stations to accommodate the transmit power to the path loss and fading. By doing so, the carrier-to-interference ratio of traffic channels is adapted to the particular location of the mobile stations. However, adjusting downlink transmit power alone does not necessarily achieve expected performance of the network, because the power control is usually not applicable to the common control channels. The common control channels include beacon channels, paging channels, access channels, overhead channels, or equivalent channels for controlling and managing subscriber traffic.

Beacon channels are often used to make hand-off decisions and to provide access for the mobile station accessing the network. Because a beacon channel needs to be simultaneously accessible by all mobile stations within a certain geographic coverage area, the beacon channel is typically prohibited from varying its downlink transmit power. The beacon channel is generally transmitted with the maximum downlink transmit power of all channels in a cell and remains constant. The broadcast control channel (BCCH) in Group Special Mobile (GSM) and PILOT in IS-95 are examples of beacon channels. The downlink transmit power of the beacon channel determines the "talk-out" radio frequency coverage of the cell served by the base station. As such, a predictable downlink transmit power of the beacon channel is crucial for the establishment of the cell boundary and for the hand-off efficiency.

In one common scheme, the downlink transmit power of the beacon channel in a CDMA system forms the reference of all other channels including traffic channels. In certain TDMA systems, the traffic channels are transmitted with the same fixed power as the beacon channel unless the power control is applied. Even under power control in a TDMA system, the maximum available downlink transmit power of the traffic channel is usually determined by the beacon downlink transmit power.

The present power allocation method recognizes that, in a wireless network, each base station requires an individual resultant downlink transmit power for its beacon channel, to accommodate to its unique radio frequency coverage environment. The transmit-power allocation of the proper downlink transmit power to the beacon channel of each base station is crucial to the optimal or proper performance of the network. Therefore, one significant application of the adjustment method of the invention involves finding the an optimal or adequate transmit-power allocation of the transmit power for each beacon channel. The traffic channels may then use the resultant downlink transmit power as a reference for their downlink transmit power to enhance radio frequency coverage of the entire wireless network, or a portion thereof.

In accordance with the invention, the transmit-power allocation method allocates just the requisite downlink power to various base stations, and preferably no more power than required, to attain reliable radio frequency coverage, maximize radio frequency capacity, or both. The transmit-power allocation method is well-suited for providing a network-wide solution as the resultant transmit downlink powers on a base-station by base-station basis. The resultant transmit downlink power may be mathematically verifiable as an optimal or appropriate downlink power, rather than relying upon an iterative trial-and-error technique to set transmit power levels for the base stations of a wireless network.

The transmit-power allocation method of the invention generally comprises an algorithm for execution on a general purpose computer. As input data, the algorithm primarily requires the signal power measured by a test receiver in as few as one test drive through the given network. Thus, the transmit-power allocation method not only enhances the radio frequency coverage reliability, but may also reduces the time and cost required for conducting network power allocation.

Further, unlike typical analytical approaches used in the network planning, the transmit-power allocation method of the invention does not require a priori or presumptive information for modeling the propagation environment, such as topographic data, antenna height above average terrain, location of the base stations, and antenna characteristics. Instead, the transmit-power allocation method of the invention only requires field measurements as input data to yield a system-wide solution for downlink transmit powers of the base stations. The field measurements implicitly provide data theoretically related to the foregoing presumptive information, but in a more accurate fashion based on a realistic tests of an actual wireless network. Accordingly, the transmit-power allocation method is insensitive to the inaccuracy associated with other analytical approaches using modeling techniques in network planning.

The algorithm infers just the requisite transmission power for one or more channels associated with each base station to achieve a target carrier-to-interference, or analogous reliability goal, over the geographic area of the wireless network, or a portion thereof. The target carrier-to-interference ratio may be expressed in decibels and as a probability for meeting or exceeding that decibel level. The requisite transmission power for each base station may be inferred based on a relationship between a target carrier-to-interference ratio and received downlink radio frequency signals. As result, the beacon channel of each base station may be adjusted to an appropriate or an optimal downlink power value that provides the expected carrier-to-interference ratio.

The resultant downlink transmit power may refer to the resultant downlink power of the beacon channels, such as the PILOT channels of an IS-95 CDMA system. In practice, controlling the resultant downlink transmit power of the beacon channels forms a reference for other radio frequency communications channels, such as traffic channels, as previously described. The resultant downlink power may also be applied to other common control channels, other than the beacon channels. Further, the resultant downlink transmit power may be directly applied to a downlink transmit power of a traffic channel in a TDMA system that is not equipped with a power control mechanism.

The criterion for the transmit-power allocation of the resultant downlink power preferably constitutes more than mere compliance with the target carrier-to-interference ratio. In particular, if the wireless network comprises a CDMA system, minimizing the downlink transmit power of each base station to a certain extent is desirable. Because the traffic capacity of a CDMA system is proportional to the number of users per unit power, the resultant downlink power should not unnecessarily exceed the target-to-carrier interference ratio. Further, a low downlink transmit power level may reduce concerns of electromagnetic biological hazards. Therefore, the resultant downlink power represents finding the minimum downlink power for each base station necessary to produce the just required carrier-to-interference ratio. The resultant downlink transmit power allocation on a system-wide basis is determined based on evaluation among other feasible transmit-power allocations of downlink power. Because the transmit-power allocation method is applicable to unloaded as well as loaded system, the transmit-power allocation method is an efficient tool for an initial post-installation power allocation as well as subsequent periodic network power allocations.

This specification describes various illustrative embodiments of the method of the present invention. The scope of the claims is intended to cover various modifications and equivalent arrangements of the illustrative embodiments disclosed in the specification. Therefore, the following claims should be accorded the reasonably broadest interpretation to cover the modifications, equivalent structures, and features, which are consistent with the spirit and scope of the invention disclosed herein.

What is claimed is:

1. A method for allocating downlink power in a wireless network comprising the steps of:
   measuring received signal parameters, of electromagnetic transmissions from base stations, at measurement locations within defined radio frequency coverage areas, the measurement locations being geographical points where mobile stations may obtain wireless service from the wireless network;
   determining propagation factors associated with the electromagnetic transmissions as a function of the measurement locations; and
   determining a downlink transmit power for at least one of the base stations based upon the propagation factors and a target performance goal for the coverage areas.

2. The method according to claim 1 further comprising the step of:
   calibrating the downlink transmit power to satisfy the target performance goal for the measurement locations with a defined reliability.

3. The method according to claim 2 wherein the calibrating step includes calibrating the initial downlink transmit power by considering a known maximum transmit power of each of the base stations.

4. The method according to claim 1 further comprising the step of:
   calibrating the downlink transmit power to satisfy a target carrier-to-interference ratio as the target performance goal for the measurement locations with a defined reliability.

5. The method according to claim 4 wherein the calibrating step comprises establishing the defined reliability as a percentage of time in a coverage area during which the target-to-carrier interference ratio is met or exceeded.

6. The method according to claim 1 further comprising the step of:
   calibrating the downlink transmit power to obtain a corresponding actual carrier-to-interference ratio meeting or minimally exceeding a target carrier-to-interference ratio as the target performance goal for the measurement locations with a defined reliability.

7. The method according to claim 1 wherein the measuring step further comprises measuring background noise associated with each of the measurement locations, the background noise being within a frequency range of the electromagnetic transmissions, and wherein the calculating step further comprises calculating the downlink transmit power for each of the base stations based upon the propagation factors, background noise and signal strengths as the measured signal parameters, and a target carrier-to-interference ratio as the target performance goal.

8. The method according to claim 1 wherein the determining of the propagation factors further comprises determining a propagation factor matrix including respective propagation factors for at least one propagational path between each measurement location and a corresponding base station.

9. The method according to claim 1 wherein the determining of the propagation factors further comprises determining a propagation factor matrix having columns representing uniform base station identifiers and rows representing uniform measurement locations.

10. The method according to claim 1 wherein the determining of the propagation factors is accomplished in accordance with the following equation:

$$E_i(x) = \frac{V_i(x) - N(x)}{y_i}$$

wherein $y_i$ is a known downlink power of base station i, $V_i(x)$ is a received signal parameter as a function of measurement location x, and $N(x)$ is a background noise power as a function of measurement location x.

11. The method according to claim 1 wherein the determining of the downlink transmit power includes the following steps:
   constructing a vector $z=\{z_i\}_{i=1}^{n}$ and a matrix $A=\{a_{ij}\}_{i,j=1}^{n}$ in accordance with the following equations:

$$z_i = C_i \frac{\sum_{k=1}^{m} N(x_k) E_i(x_k)}{\sum_{k=1}^{m} E_i^2(x_k)}$$

$$a_{ij} = C_i \frac{\sum_{k=1}^{m} E_i(x_k) E_j(x_k)}{\sum_{k=1}^{m} E_i^2(x_k)}$$

wherein $C_i$ represents a carrier-to-interference ratio for a defined coverage area i, $E_i(x)$ is a propagation factor for first set of defined coverage areas i, $E_j(x)$ is a propagation factor for a second set of defined coverage areas distinct from the first set, $N(x_k)$ represents background noise, m is, the considered number of measurement locations x, k represents a particular measurement location, and n is the total number of the defined coverage areas within the first set and the second set
   applying an iteration $w^{(n)}=w^{(0)}+A*w^{(n-1)}$ to the foregoing equations starting with $w^{(0)}=z$ to solve for the vector $w=\{w_1,w_2,w_3 \ldots w_n\}$.

12. The method according to claim 1 wherein determining of the downlink transmit power is accomplished by using a local approximation in accordance with the following inter-related equations:

$$y_i \approx C_i \cdot \frac{N^{M,i} + \sum_{j \neq i} E_j^{M,i}}{E_i^{m,i}}$$

$$E_j^{M,k} = \max_{x \in S_k} E_j(x)$$

$$E_j^{m,k} = \min_{x \in S_k} E_j(x)$$

$$N^{M,i} = \max_{x \in S_i} N(x)$$

wherein $y_i$ is a known downlink power of base station i, $C_i$ represents a carrier-to-interference ratio for a defined coverage area, $E_i(x)$ is a propagation factor for first set of defined coverage areas i, $E_j(x)$ is a propagation factor for a second set of defined coverage areas distinct from the first set, $N(x)$ represents background noise, m is the considered number of measurement locations x, k represents a particular measurement location, and $S_i$ refers to the defined measurement locations x within the coverage area i.

13. The method according to claim 1 further comprising the step of:
   adjusting downlink transmit-power settings of corresponding base stations to conform with a system-wide constellation of the downlink transmit powers selected to meet or minimally exceed the target performance goal.

14. A method for allocating downlink power in a wireless network comprising the steps of:

measuring received signal strengths, of electromagnetic transmissions from base stations, at measurement locations within geographic coverage areas, the measurement locations being geographical points where mobile stations may obtain wireless service from the wireless network;

determining propagation factors of the electromagnetic transmissions for at least one propagational path between each of said measurement locations and a corresponding base station;

calculating an initial downlink transmit power within a transmitter power interval for each of the base stations based upon the propagation factors and target carrier-to-interference ratios for the measurement locations; and calibrating the initial downlink transmit power to obtain a resultant downlink transmit power satisfying the target carrier-to-interference ratios for the measurement locations with at least a minimum probability.

15. The method according to claim 14 further comprising the step of:

selecting the target carrier-to-interference ratios as generally uniform throughout a majority of the geographic coverage areas in the wireless network.

16. The method according to claim 14 further comprising the step of:

selecting the target carrier-to-interference ratios as different for different ones of the geographic coverage areas, wherein the geographic coverage areas comprise one or more sectors of a cell with different estimated traffic loadings.

17. The method according to claim 14 further comprising the step of:

adjusting downlink transmit powers of the base stations to conform to resultant downlink transmit powers selected to satisfy the target carrier-to-interference ratios for the corresponding measurement locations.

18. The method according to claim 14 wherein the resultant downlink transmit power comprises a resultant downlink transmit power meeting or minimally exceeding the target carrier-to-interference ratios for the corresponding measurement locations.

19. The method according to claim 14 further comprising the step of:

adjusting a downlink transmit power of a beacon channel of a first one of the base stations to conform to the resultant downlink transmit power.

20. The method according to claim 19 further comprising the step of:

adjusting a downlink transmit power of traffic channels of at least the first one based on a power control algorithm using the beacon channel as a reference signal power for a maximum permitted downlink transmit power of the traffic channels.

21. The method according to claim 14 wherein the calibrating step calculates a calibration factor by executing the following equation:

$$\alpha = \min_{i=1}^{n} \left\{ \frac{y_i^M}{w_i}, \max_{i=1}^{n} \max_{x \in S_i} \frac{C_i \cdot N(x)}{w_i E_i(x) - C_i \sum_{j=1}^{n} w_j E_j(x)} \right\}$$

wherein $y_i$ is a known maximum downlink power of base station i, $C_i$ represents a carrier-to-interference ratio for a defined coverage area, $E_i(x)$ is a propagation factor for first set of defined coverage areas i, $E_j(x)$ is a propagation factor for a second set of defined coverage areas distinct from the first set, $N(x)$ represents background noise, x represents a measurement location, n represents a total number of the first set or the second set, $w_i$ represents an initial downlink power for base station i within a power interval, and $w_j$ represents a initial downlink power for base station j within a power interval.

22. The method according to claim 14 wherein the calibrating step establishes each resultant downlink power as a function of a calibration factor and a function of the target carrier-to-interference ratio as applied to the propagation factors.

23. The method according to claim 14 wherein the calibrating step establishes each resultant downlink power in accordance with the following equations:

$$w_i = \frac{C_i}{\min_{x \in S_i} C_i(x, 1)}$$

$$y_i = \alpha w_i \text{ for } i = 1, 2, \ldots n.$$

wherein $C_i$ represents a carrier-to-interference ratio for a defined coverage area i, x represents a measurement location, $w_i$ represents an initial downlink power for base station i within a power interval, $S_i$ refers to defined measurement locations x within the coverage area i, $\alpha$ is an attenuation factor, and $y_i$ is a resultant downlink transmit power for base station i.

24. A system for allocating downlink power in a wireless network including base stations, the system comprising:

a test receiver for measuring received signal strengths, of electromagnetic transmissions from the base stations, at measurement locations within defined radio frequency coverage areas, the measurement locations being geographical points where mobile stations may obtain wireless service from the wireless network; and a processing system including a determiner for determining propagation factors and a calculator for calculating initial downlink transmit powers for the base stations, the propagation factors being associated with the electromagnetic transmissions as a function of the measurement locations, the initial downlink transmit powers being within corresponding transmitter power intervals based upon the propagation factors and at least one target performance goal for the coverage areas.

25. The system according to claim 24 wherein the processing system further comprises:

a calibrator for calibrating the initial downlink transmit powers to obtain resultant downlink transmit powers satisfying a target carrier-to-interference ratio as the target performance goal for the measurement locations with a defined reliability.

26. The system according to claim 24 wherein the processing system further comprises:

a calibrator for calibrating the initial downlink transmit powers to obtain resultant downlink transmit powers with corresponding actual carrier-to-interference ratios meeting or minimally exceeding a target carrier-to-interference ratio as the target performance goal for the measurement locations with a defined reliability.

27. The system according to claim 24 wherein the processing system includes a calibrator for calibrating the initial downlink transmit powers by considering a known maximum transmit power of each of the base stations.

28. The system according to claim 24 wherein the processing system is adapted to establish the defined reliability as a percentage of time in a coverage area during which the target-to-carrier interference ratio is met or exceeded.

29. The system according to claim 24 wherein the test receiver is adapted to measure background noise associated with each of the measurement locations, the background noise being within a frequency range of the electromagnetic transmissions, and wherein the calculator is arranged to calculate the initial downlink transmit power for each of the base stations based upon the measured signal strengths, the measured background noise, the propagation factors, and a target carrier-to-interference ratio as the target performance goal.

30. The system according to claim 24 wherein the determiner is arranged to determine a propagation factor matrix including respective propagation factors for at least one propagational path between each measurement location and a corresponding base station.

31. The system according to claim 24 wherein the determiner is arranged to determine a propagation factor matrix having columns representing uniform base station identifiers and rows representing uniform measurement locations.

* * * * *